(12) United States Patent
Hedlund et al.

(10) Patent No.: US 6,651,034 B1
(45) Date of Patent: Nov. 18, 2003

(54) APPARATUS AND METHOD FOR PERFORMANCE AND FAULT DATA ANALYSIS

(75) Inventors: Eric H. Hedlund, Erie, PA (US); Nicholas Edward Roddy, Clifton Park, NY (US); David Richard Gibson, North East, PA (US); Richard G. Bliley, Erie, PA (US); James E. Pander, Erie, PA (US); Ashish Puri, Erie, PA (US); Thomas E. O'Camb, Erie, PA (US); John Howard Lovelace, II, Erie, PA (US); Steven Loncher, Erie, PA (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 09/629,597

(22) Filed: Jul. 31, 2000

Related U.S. Application Data

(60) Provisional application No. 60/162,296, filed on Oct. 28, 1999.

(51) Int. Cl.[7] .......................... G06F 11/30; G06F 15/00; G21C 17/00
(52) U.S. Cl. .......................................... 702/183; 701/30
(58) Field of Search ...................... 702/33–36, 112–115, 702/179–185; 701/1, 19, 29–30; 340/438, 901; 717/159–161, 124–135; 709/102–104

(56) References Cited

U.S. PATENT DOCUMENTS

| | | | |
|---|---|---|---|
| 4,270,174 A | * | 5/1981 | Karlin et al. ............... 701/115 |
| 4,463,418 A | | 7/1984 | O'Quin, II et al. |
| 4,517,468 A | | 5/1985 | Kemper et al. |
| 4,695,946 A | | 9/1987 | Andreasen et al. |
| 4,823,914 A | | 4/1989 | McKinney et al. |
| 4,970,725 A | | 11/1990 | McEnroe et al. |
| 4,977,390 A | | 12/1990 | Saylor et al. |
| 5,113,489 A | | 5/1992 | Cihiwsky et al. |
| 5,123,017 A | | 6/1992 | Simpkins et al. |
| 5,132,920 A | | 7/1992 | Bellows et al. |
| 5,274,572 A | | 12/1993 | O'Neill et al. |
| 5,282,127 A | | 1/1994 | Mii |
| 5,321,837 A | | 6/1994 | Daniel et al. |
| 5,329,465 A | | 7/1994 | Arcella et al. |
| 5,400,018 A | | 3/1995 | Scholl et al. |
| 5,445,347 A | | 8/1995 | Ng |
| 5,508,941 A | | 4/1996 | Leplingard et al. |
| 5,528,516 A | | 6/1996 | Yemini et al. |
| 5,594,663 A | | 1/1997 | Messaros et al. |
| 5,633,628 A | | 5/1997 | Denny et al. |
| 5,638,296 A | | 6/1997 | Johnson et al. |
| 5,661,668 A | | 8/1997 | Yemini et al. |

(List continued on next page.)

FOREIGN PATENT DOCUMENTS

| | | |
|---|---|---|
| EP | 0 810 558 A2 | 12/1997 |
| JP | 62198943 | 9/1987 |
| WO | WO 90/09645 A1 | 8/1990 |
| WO | WO 97/13064 A2 | 4/1997 |

OTHER PUBLICATIONS

Johnson, Daniel; Data–Tronic Gas Turbine Information and Control System; 1981; Schenectady, New York; USA.

*Primary Examiner*—Hal Wachsman
*Assistant Examiner*—Mary Catherine Baran
(74) *Attorney, Agent, or Firm*—Carl A. Rowold; John L. DeAngelis, Jr.; Beuss Brownlee Bowdoin & Wolter, P.A.

(57) ABSTRACT

An analysis scheduler for scheduling the automatic processing of performance data through a plurality of analysis tools is disclosed. Performance data provided to some of the tools by the analysis scheduler may be specified to be within a predetermined (but variable) look-back period. The analysis tools identify faults and anomalous conditions and also create repair recommendations, and automatically create problem cases when conditions warrant, or update existing problem cases with additional data, all under control of the analysis scheduler. The problem cases are reviewed by a human user and then forwarded to the railroad for implementation.

24 Claims, 19 Drawing Sheets

U.S. PATENT DOCUMENTS

| | | |
|---|---|---|
| 5,666,534 A | 9/1997 | Gilbert et al. |
| 5,678,002 A | 10/1997 | Fawcett et al. |
| 5,737,215 A | 4/1998 | Schricker et al. |
| 5,742,915 A | 4/1998 | Stafford |
| 5,806,011 A | 9/1998 | Azzaro et al. |
| 5,856,931 A * | 1/1999 | McCasland .................. 702/182 |
| 5,956,664 A * | 9/1999 | Bryan ......................... 702/184 |
| 5,961,567 A | 10/1999 | Azzaro et al. |
| 6,014,612 A * | 1/2000 | Larson et al. ................ 702/183 |
| 6,115,653 A * | 9/2000 | Bergstrom et al. ............ 701/29 |
| 6,192,325 B1 * | 2/2001 | Piety et al. .................. 702/184 |
| 6,317,701 B1 * | 11/2001 | Pyotsia et al. ............... 702/188 |

\* cited by examiner

APPARATUS AND METHOD FOR PERFORMANCE AND FAULT DATA ANALYSIS

This patent application claims the benefit of U.S. Provisional Application No. 60/162,296 filed on Oct. 28, 1999.

BACKGROUND OF THE INVENTION

This invention relates to a method and apparatus for automatically analyzing parametric performance and fault related data from a machine, specifically from a railroad locomotive.

Cost efficient operation of a railroad requires minimization of line-of-road failures and locomotive down time. Failure of a major locomotive subsystem can cause serious damage, costly repairs, and significant operational delays. A locomotive break-down while in service is an especially costly event, requiring the dispatch of a replacement locomotive to pull the train consist and possibly rendering a track segment out of service until the train is moved. As a result, the health of the locomotive engine and its constituent subsystems is of significant concern.

Heretofore, there has been no automatic or systematic mechanism for the diagnosis of locomotive faults or for the identification of incipient problems. Instead, conventionally, the railroad has relied on regular inspections and the observation of performance anomalies by the locomotive operator. Some cursory inspection processes are accomplished while the locomotive is in service; more thorough inspections require the locomotive to be taken out of service for several days. In any case, locomotive down time, whether for inspection or repair, represents a significant railroad cost. The avoidance of these costs by accurate fault diagnosis and prediction of potential failures represents an important cost saving opportunity for the railroads.

The prior art solutions to these problems focus on the engineering design process with an objective of increasing the mean time between failure for locomotive subsystems and components. While this is certainly a commendable objective, it remains for the railroads to continue their cost containment goals through the collection and monitoring of real time performance data and fault related information directly from the locomotive, and the implementation of repairs before the problem requires significant down time.

SUMMARY OF THE INVENTION

The above mentioned difficulties and disadvantages associated with locomotive failures can be ameliorated by the present invention, which relates to a novel and non-obvious apparatus and method for analyzing real time performance and fault-related data downloaded from a fleet of locomotives.

U.S. Patent Application entitled "On-Board Monitor for a Railroad Locomotive" (filed on Oct. 25, 2000 with application Ser. No. 09/696,368, claiming the benefit of U.S. Provisional Application 60/161,965 filed on Oct. 28, 1999), owned by the Assignee of the present invention discloses and claims a method and apparatus for collecting parametric performance and fault data from an operating locomotive and transferring the data to a monitoring and diagnostic service center. The present invention describes and claims a method and apparatus for analyzing the received data to identify anomalous conditions and the source of potential or actual faults, and for recommending repair actions.

In one application of the present invention, each locomotive in a railroad's fleet of locomotives includes an on-board monitor, as described in the related application identified above. After data collection, the on-board monitor transmits performance and fault data on a regular basis to a monitoring and diagnostic service center, where the present invention analyzes the received data. There could be as many as 3,000 locomotives in a fleet, each reporting data on a daily basis. Such an enormous amount of data will easily overload a human operator. It is thus necessary to automate the execution of analysis tools so that the analysis of fault and parametric performance data from the automated data downloads can be accomplished in an efficient and productive manner.

In accordance with the teachings of the present invention, the scheduling and execution of each analysis tool occurs without human intervention and is based upon dynamic and time-critical criteria applied to the received data. For instance, one such criterion could be the priority of the queued data awaiting analysis. The present invention automatically schedules, prioritizes, and oversees the execution of one or more analysis and diagnostic tools for analyzing the locomotive data. The analysis scheduler of the present invention also conducts on-line monitoring of the downloaded data, prioritizes the data queued for each analysis tool, and ensures that all prerequisites are met before triggering execution of an analysis or diagnostic tool. In one embodiment, for example, there may be limits on the number of instances of each tool that can be executed simultaneously, and the limits may be dependent on the priority of the data. For instance, one limit applies to normal priority data and a second limit applies to high priority data. The analysis scheduler maintains and enforces these limits. In the event that a system outage occurs, the analysis scheduler automatically restarts each analysis tool that was processing when the outage occurred. In the event of an analysis tool failure, the automatic scheduler retries operation of the failed tool, until a predetermined retry limit is reached.

Following execution of the analysis tools, the present invention creates a problem case for each problem or anomaly identified by the automated analysis process. To focus the limited human resources on actual problem solving, it is desirable to automatically create the problem cases. The problem case incorporates the outputs from the multiple analysis and diagnostic tools and includes all relevant data, including symptoms, the nature of any fault, related performance parameters, diagnostic information, and repair recommendations as generated by the automated analysis process. The problem case generator displays all this information visually for viewing by a human diagnosis and repair expert.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
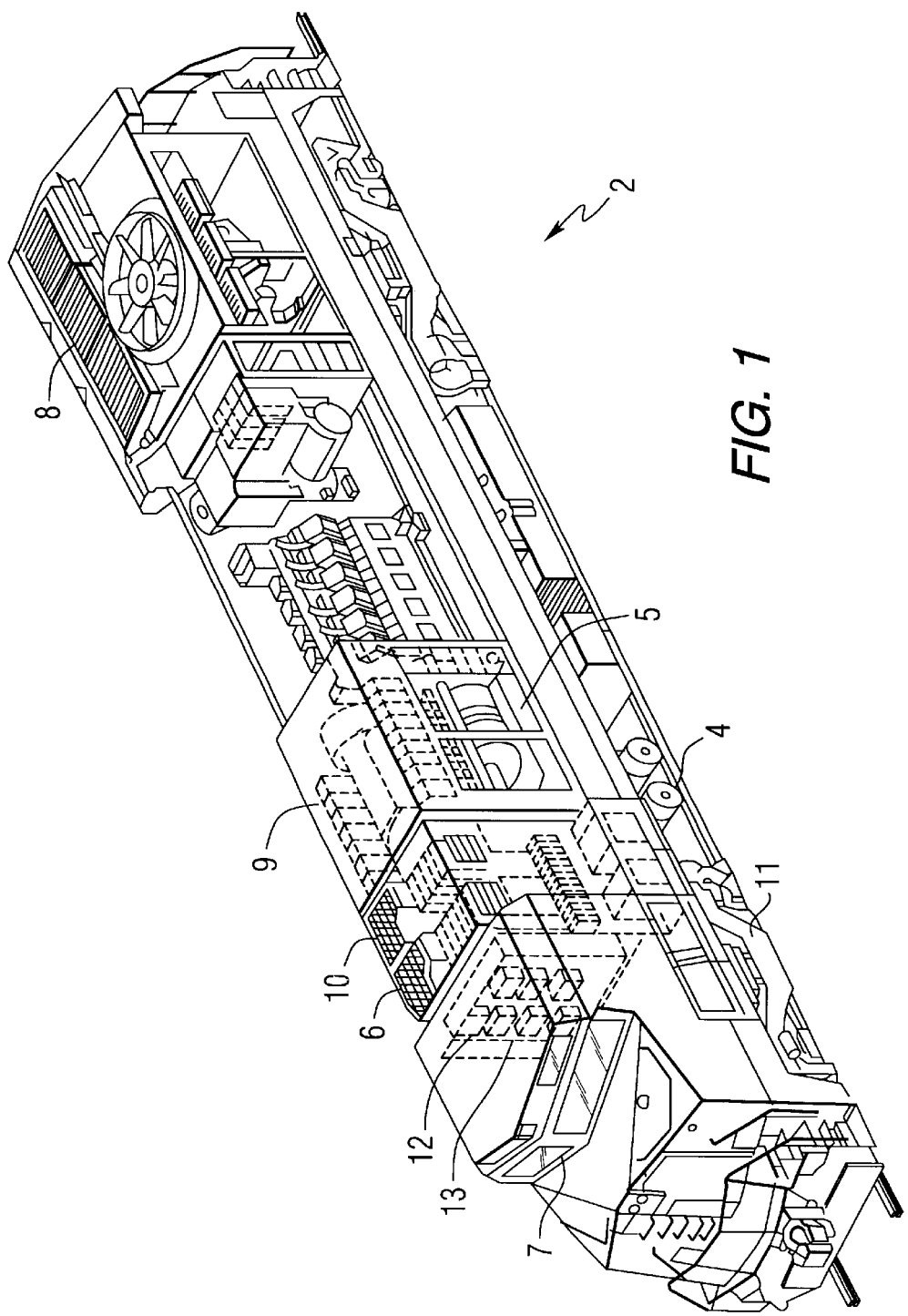
FIG. 1 illustrates the peripheral devices with which the analysis scheduler of the present invention communicates.

Before describing in detail the particular analysis scheduler and case generator in accordance with the present invention, it should be observed that the present invention resides primarily in a novel combination of processing steps and hardware related to an analysis scheduler and case generator operating on data received from a railroad locomotive. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

Figure 2:
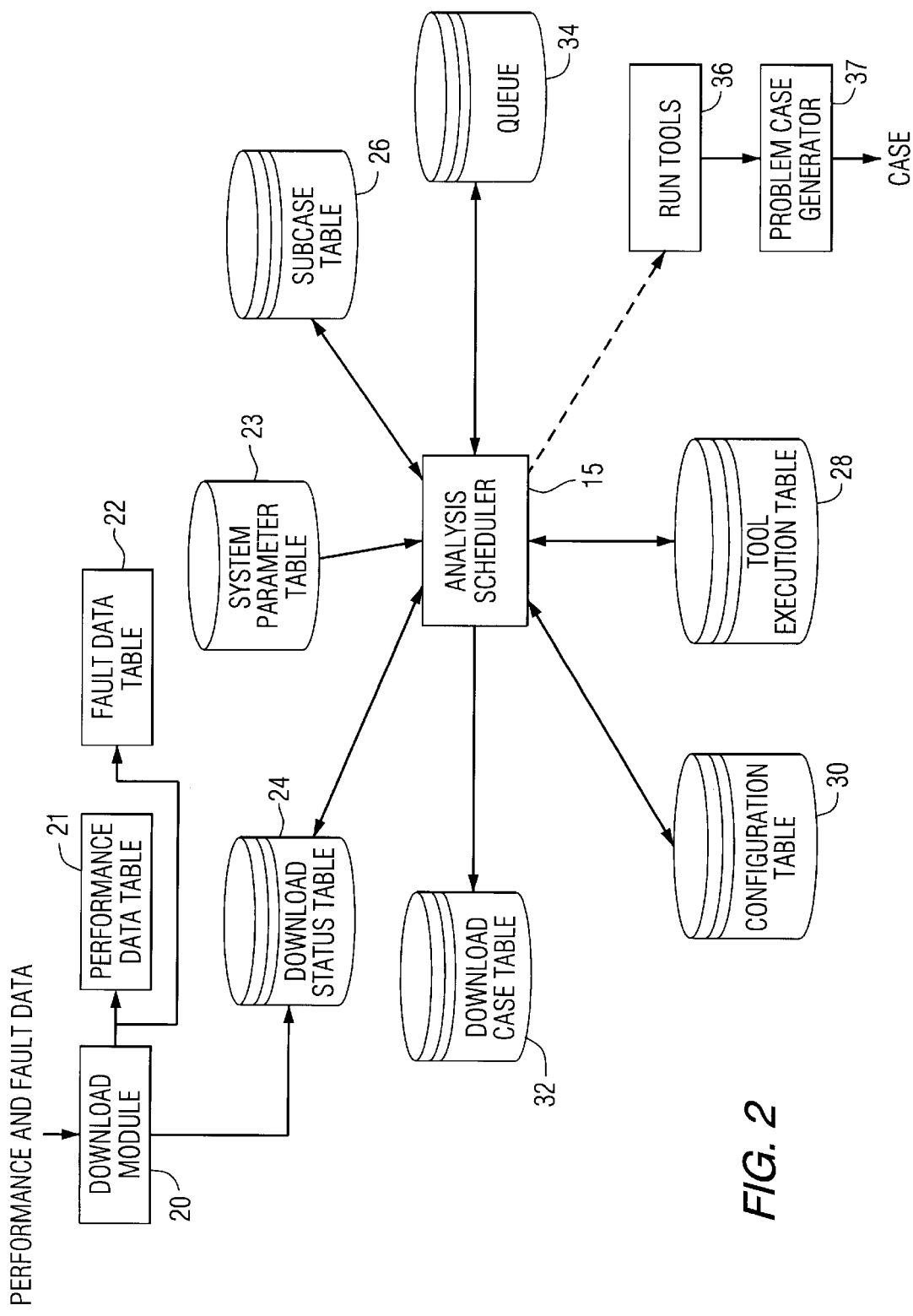
FIG. 2 depicts a microprocessor implementation of the present invention.

FIG. 1 shows an analysis scheduler 10 and the various tables with which it communicates. The analysis scheduler 10 is implemented as a computing device as illustrated in FIG. 2. The elements of the computing device are well known to those skilled in the art and include a microprocessor 12, a non-volatile memory 14, a RAM 16, and an input/output interface 18. The structure and operation of these devices are conventional in all respects and well known.

Returning to FIG. 1, a download module 20 receives performance and fault data, for instance from an on-board monitor discussed in detail in the patent application identified above, entitled "On-Board Monitor for a Railroad Locomotive". This patent application is incorporated herein by reference. The download module 20 receives the performance and fault data, creates a download case that includes that downloaded data, and inputs the data to a performance data table 21 and a fault data table 22. To keep track of data in a given download session with a given locomotive, the present invention automatically creates the download case. Information relevant to the download is "attached" to this download case and its subcases. There is a different download case for each time that a locomotive is run through the download process. As will be discussed further in conjunction with FIG. 7, certain locomotive faults create an immediate call home situation, whereby the on-board monitor immediately contacts the monitoring and diagnostic service center. After which the relevant fault and parametric data is downloaded from the locomotive to the monitoring and diagnostic service center.

The download module 20 also adds a record to a download status table 24 when the loading of fault or other data to the performance data table 21 and the fault data table 22 is complete. The analysis scheduler 10 monitors the download status table 24 and activates the various analysis and diagnostic tools, as will be discussed further herein below, when the data needed by those tools is available in the performance data table 21 and the fault data table 22. The analysis scheduler 10 deletes entries in the download status table 24 when tool execution on the downloaded data has been scheduled, i.e., when a record has been created in a queue 34. In one embodiment, each tool has a unique queue, although that is not specifically shown in FIG. 1.

Specifically, when the download status table 24 indicates that a particular download of data is complete, the analysis scheduler 10 creates a download tool subcase, i.e., a subcase to the download case, for each tool that will process the downloaded data and then dispatches a record of that download tool subcase to the queue 34 for that specific tool. The subcases are stored in a subcase table 26. The actual tool execution on specific data is prioritized by the type of data in the queue 34 and also the time when the download tool subcase record was created. Certain types of downloaded performance or fault data will have a higher priority than others. The analysis scheduler 10 spawns the tools, as will be discussed below. As the various analysis tools process the downloaded data, they create output data of their own. Each download tool subcase is augmented with this data from its associated analysis tool, as well as status information about the progress of the tool's execution.

In one embodiment, there are four classes of downloaded data, each assigned a different priority rating. The highest priority class is a data download requested by the locomotive owner. The next highest priority are those downloads initiated by a "call-home" from the locomotive. The third priority class is based on data downloaded in response to a request from a locomotive expert at the monitoring and diagnostic center. Finally, the fourth priority class includes all other, so-called "normal" downloads.

The analysis scheduler 10 updates tool execution information in the download tool subcases, as stored in the subcase table 26. Each download tool subcase includes a tool status entry indicating the execution status of each tool. For instance, a single tool can be running simultaneously on four different packets of performance and fault data. Each of these four executions will likely be at a different point in the tool execution process, and tool execution can take up to several minutes, dependent upon the amount of data to be processed and the specific tool. Thus, the download tool subcase reflects the running status of each tool for each simultaneous instantiation for the tool. Included among these status indicators are: execution not started, tool has exceeded its retry limit, tool has exceeded its execution time limit, tool execution completed normally, and a series of sequential values, wherein each value in the sequence indicates the current point on the tool execution timeline. The analysis scheduler 10, by checking the download tool subcase in the subcase table 26, can detect when a specific tool execution is complete, has failed, or has terminated before completion.

A tool execution table 28 contains a record for each tool, including tool operational parameters, such as execution limits and execution prerequisites. One of these parameters sets a limit on the number of simultaneous instantiations for the tool when a normal-priority execution is next in the queue. There is also a separate instantiation limit applicable to high priority tasks in the queue. The tool execution table 28 also includes various prerequisite value requirements, for example, a requirement that a certain tool must be run before another tool can process the data. Queues are monitored and tools activated in accordance with these controls stored in the tool execution table 28. When the number of executing tasks falls below the normal priority limit, the next task (in priority order) in the queue will be spawned. If a high priority task is in the queue, then the normal priority limit is ignored in favor of the high priority task. So long as the high priority limit is not exceeded, the high priority task is activated for processing.

A configuration table 30 stores information indicating which tools (and which versions thereof) should be run for data downloaded from a specific locomotive road number. The configuration table 30 also includes the file location of the tool executables.

Each download case is stored in the download case table 32. As discussed above, each download case includes the specific performance and fault data from a locomotive. In the download tool subcases, the downloaded information is bundled into a package for execution by one of the diagnosis or analysis tools. The individual download tool subcases created under each case represent the performance and fault data to be processed by the tool. After a download tool subcase has been created and appropriate entries made in the subcase table 26, the analysis scheduler 10 moves the download tool subcase to a queue 34. From here, the download tool subcase will be executed by the identified tool, when processing reaches that point in the queue 34. FIG. 1 also illustrates that the analysis scheduler 10 controls the running of the tools, after all the pertinent information is available. This is shown generally by the box bearing reference character 36 and will be discussed in greater detail in conjunction with the flow charts of FIGS. 3–6. Also, operation of a problem case generator 31 will be discussed herein below. Once a download tool subcase is completed (i.e., processing of the data by the tool is finished) then a case repetition detection program, under control of the analysis scheduler 10, closes that download tool subcase in the download case table 32.

Figure 3:
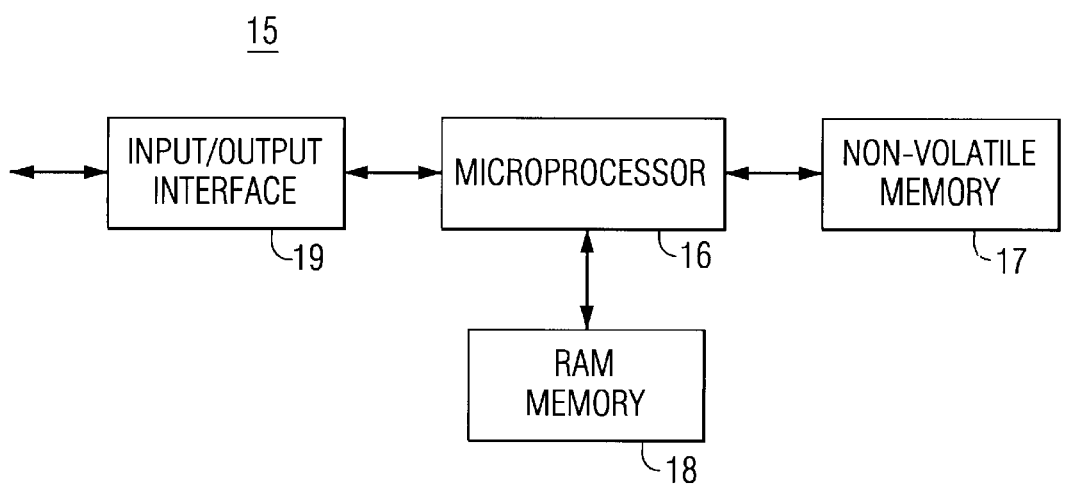
FIGS. 3, 4, 5A, 5B, and 6 illustrate subprocesses of the analysis scheduler of the present invention.
Figure 4:
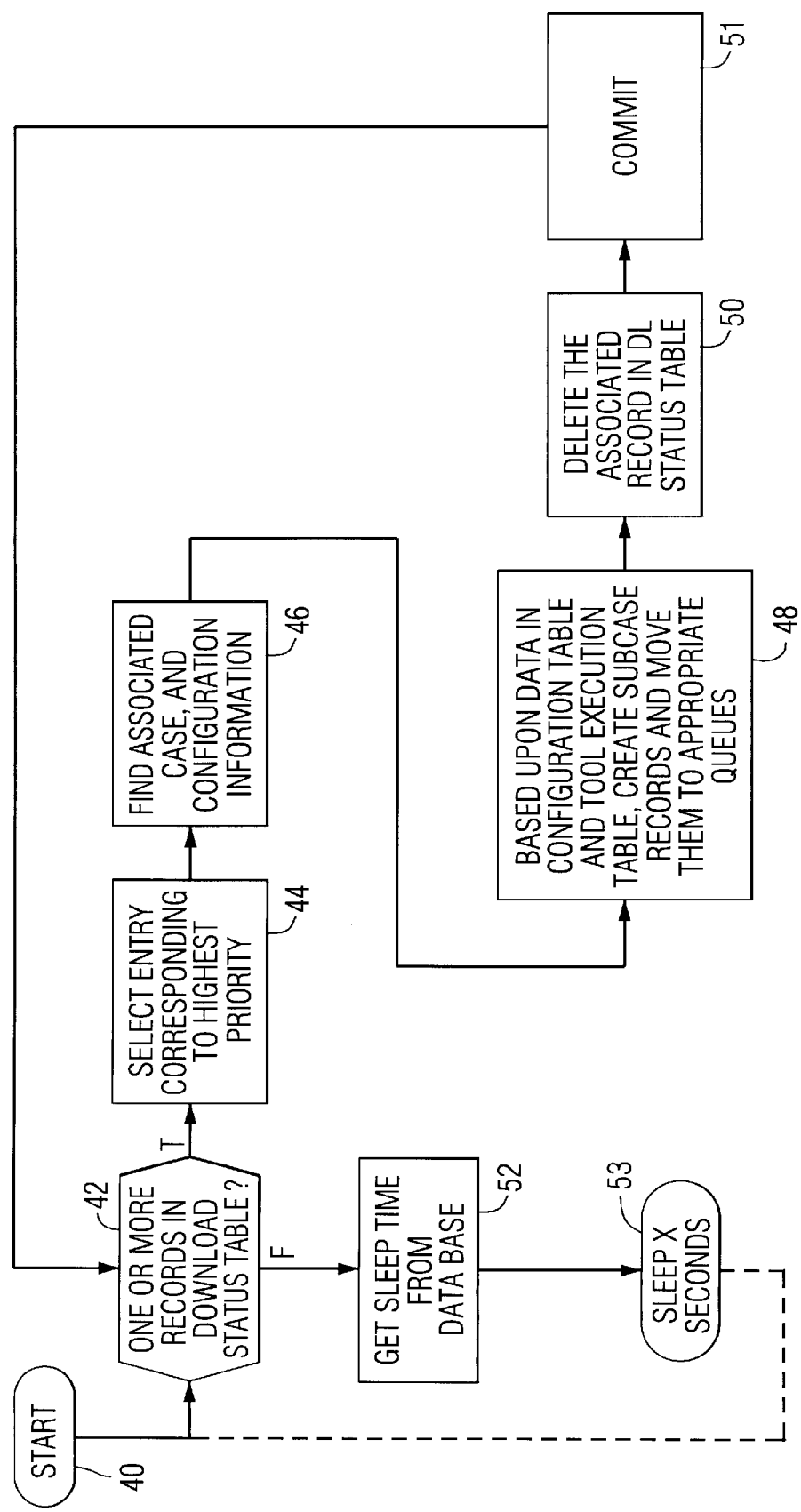

FIG. 3 illustrates the process executed by the analysis scheduler 10 in preparation for running a diagnostic or analysis tool. Processing begins at a start step 40 and continues to a decision step 42 where inquiry is made as to whether one or more records in the download status table 24 indicate that processing has not yet been initiated on a download case, i.e., performance or fault data received from the locomotive. If the result of decision step 42 is true, processing moves to a step 44 where the entry corresponding to the highest priority data is selected for processing. At a step 46, the analysis scheduler 10 locates the associated download case in the download case table 32, the necessary tool configuration and execution information from the configuration table 30 and the tool execution table 28. At a step 48, the analysis scheduler 10 creates the download tool subcase records in the subcase table 26 (based on information in the configuration table 30 and the tool execution table 28) and moves the pertinent information to the queue 34. Now that the information has been queued, at a step 50 the analysis scheduler 10 deletes the associated download case record in the download status table 24. A commit step 51 ensures that the modifications made at the steps 48 and 50 update the appropriate tables simultaneously. Processing then returns to the decision step 42, for retrieval of additional download cases.

If the result from the decision step 42 is false, at a step 52 the analysis scheduler 10 retrieves the sleep time from a system parameter table 23 of FIG. 1 and then falls into a sleep mode, as indicated at a step 53. When the sleep time has expired, processing returns to the decision step 42, where records in the download status table 42 are again checked.

FIGS. 4A and 4B are the process flow charts for the tool spawning software, which launches the execution of each of the diagnostic and analysis tools. The tool spawning software is another software component of and is executed by the analysis scheduler 10. There is one tool spawner for each tool. Processing begins at a start step 58 where the specific tool identification is input to the tool spawner process. At a step 59, the spawner sleep time is retrieved and at a step 60 the tool execution parameters (from the tool execution table 28 and the configuration table 30) are input to the tool spawner. For instance, one of these parameters is the number of permitted high-priority simultaneous tool executions. Processing then moves to a step 61 where the highest priority download tool subcase for which a retry is required (i.e., where the retry flag value is one) is selected. A retry would be required, for instance, if the system crashed while the tool was processing download tool subcase data. The setting of the retry flag will be discussed further in conjunction with FIG. 5. Processing then moves to a decision step 62 where the selection count is checked. If data was selected at the step 61, then the selection count will have a non-zero value and processing continues to a step 63 where the tool execution is spawned (i.e., the tool processes the data).

If no data was selected at the step 61, because there are no download tool subcase records awaiting a retry execution, the result of the decision step 62 is true and processing moves to a step 64. At the step 64, the tool spawner counts the number of download tool subcases that are currently running under that tool, and sets an execution count value equal to that number. Processing then moves to a step 65 where the tool spawner selects the high priority download tool subcases in the queue 34 for which all prerequisites have been met (including the completion of the download process) but having a retry flag value of zero. At a decision step 66, the selection count from the step 65 is checked. If a download tool subcase record was selected at the step 65, the result of step 66 will be false and processing moves to a decision step 67. Here the execution count (representing the number of in-process download tool cases) is compared to the simultaneous limit for high priority cases. If the latter value is greater than or equal to the former, then no additional tool executions can be spawned and processing moves to the sleep step 68. Note the sleep time for each specific tool was input to the tool spawner at the step 59. After the sleep time has elapsed, processing returns to the step 64. If the simultaneous execution limit is not exceeded, the decision step 67 produces a true result and the tool is spawned at a step 73.

If no "high priority" download tool subcase records were selected at the step 65, the result of the decision step 66 is true and processing moves to a step 69. Here the normal priority download tool subcase records are examined to determine whether any have all prerequisites satisfied and are therefore ready to be run. At a decision step 70, the selection value set at the step 69 is checked and if it is zero, indicating that there were no selections made at the step 69, processing moves to the sleep step 71. After the sleep time has elapsed, processing moves from the sleep step 71 back to the step 64.

If the step 69 resulted in a selection, the result from the decision step 70 is false and processing moves to a decision step 72. Here the executing count is compared to the simultaneous execution limit for normal priority download tool subcases. If the result is true, processing moves to the step 73 where the tool run is spawned. If the result of the decision step 72 is false, the process sleeps, as indicated by a sleep step 74. Upon reawakening, processing returns to the step 64. Following the step 73, processing returns to the step 64 to again set the execution count and select cases for tool spawning at the steps 65 and 69.

Figure 5A:
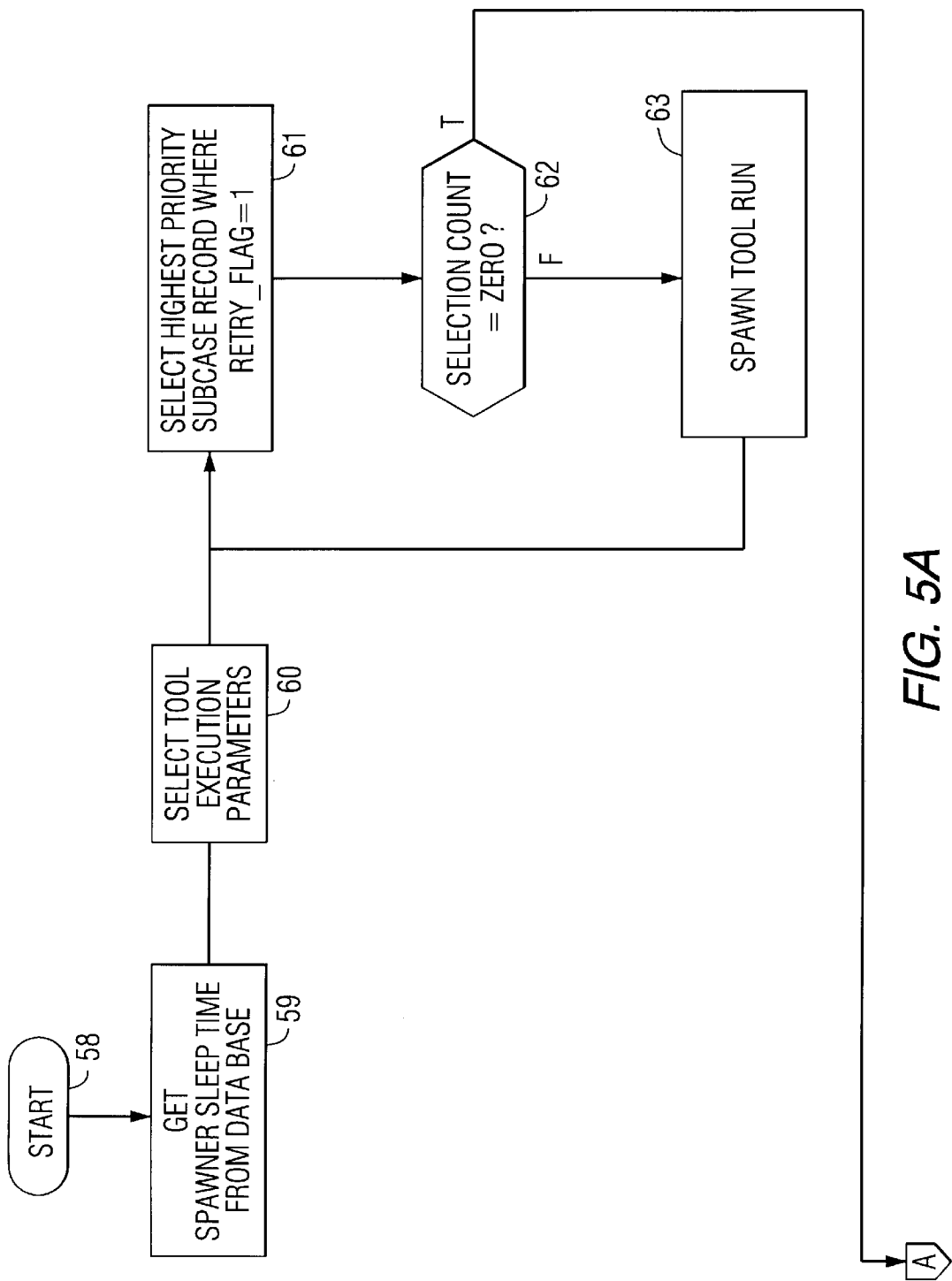
Figure 5B:
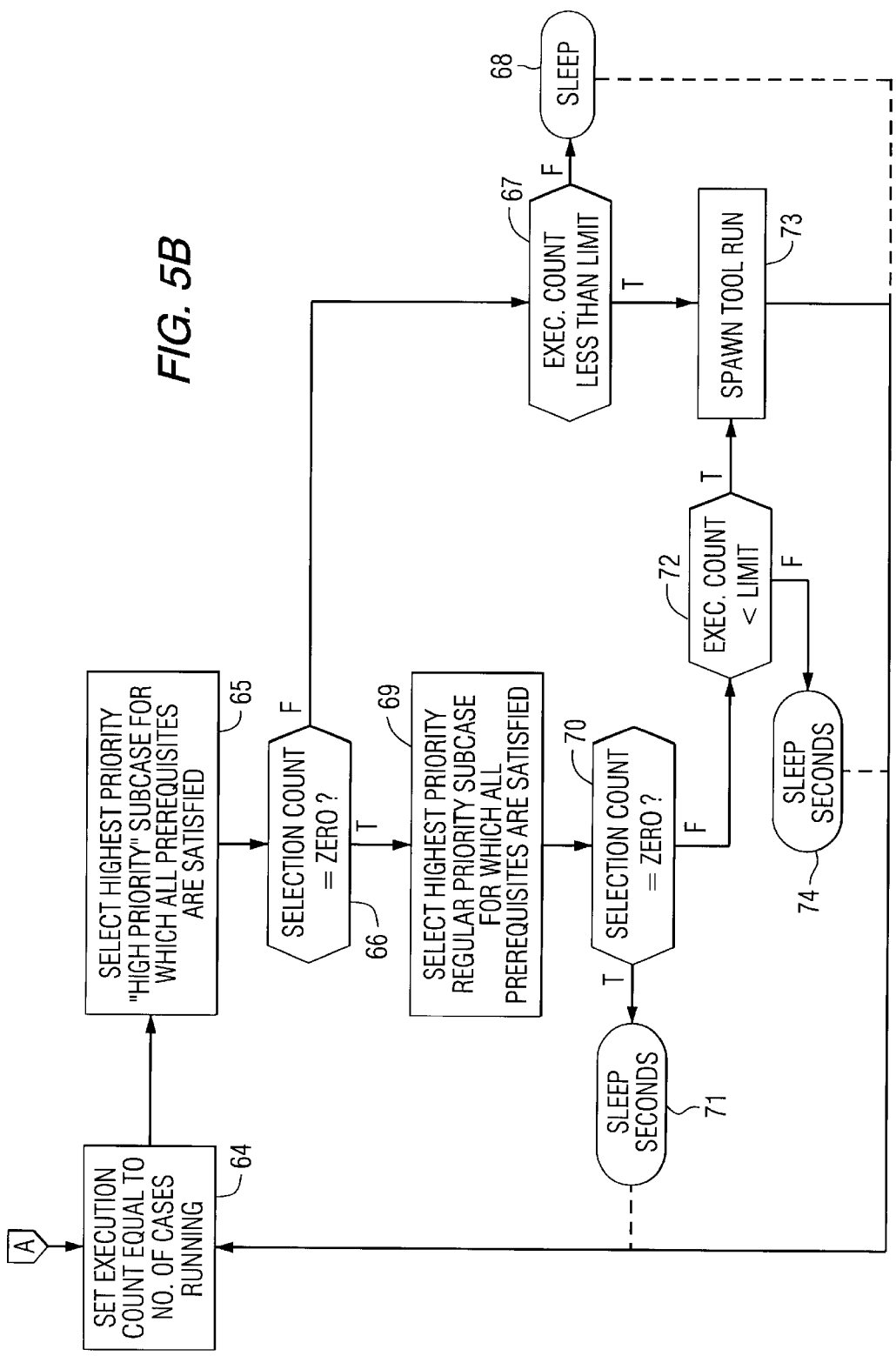

The tool monitor software process, illustrated in FIG. 5, monitors the execution of the various tools associated with the present invention to ensure that tool execution is not exceeding any tool limits. Processing begins at a start step 77 and continues to a step 78 where the monitor sleep time is obtained from the configuration table 30 and a value is set to indicate the initial pass through the tool monitor. At a step 79, tool execution parameters are obtained from the tool execution table 28. At a step 80, the download tool subcases are selected in priority order among those download tool subcases that are executing. From the step 80, processing moves to a step 81 where the next (or first, as the case may be) download tool subcase in the list is obtained. At a decision step 82, a check is made to determine whether the download tool subcase is processing. If the download tool subcase is executing, processing moves to a decision step 83. If this is the first time for processing the download tool subcase, the decision from the decision step 83 is true. Processing then continues to a step 84 where the retry flag is set to one and the download tool subcase is committed for execution by the tool. If this is not the first processing attempt, the result of the decision step 83 is false and at a decision step 85, the restart count (which is a value contained within the download tool subcase record) is compared to the retry limit. If the count is greater than or equal to the retry limit, then the execution is terminated at a step 86 and the subcase is removed from the queue. If the retry limit has not been reached, processing moves from the decision step 85 back to the step 84 and the subcase is queued for processing through the tool.

Figure 6:
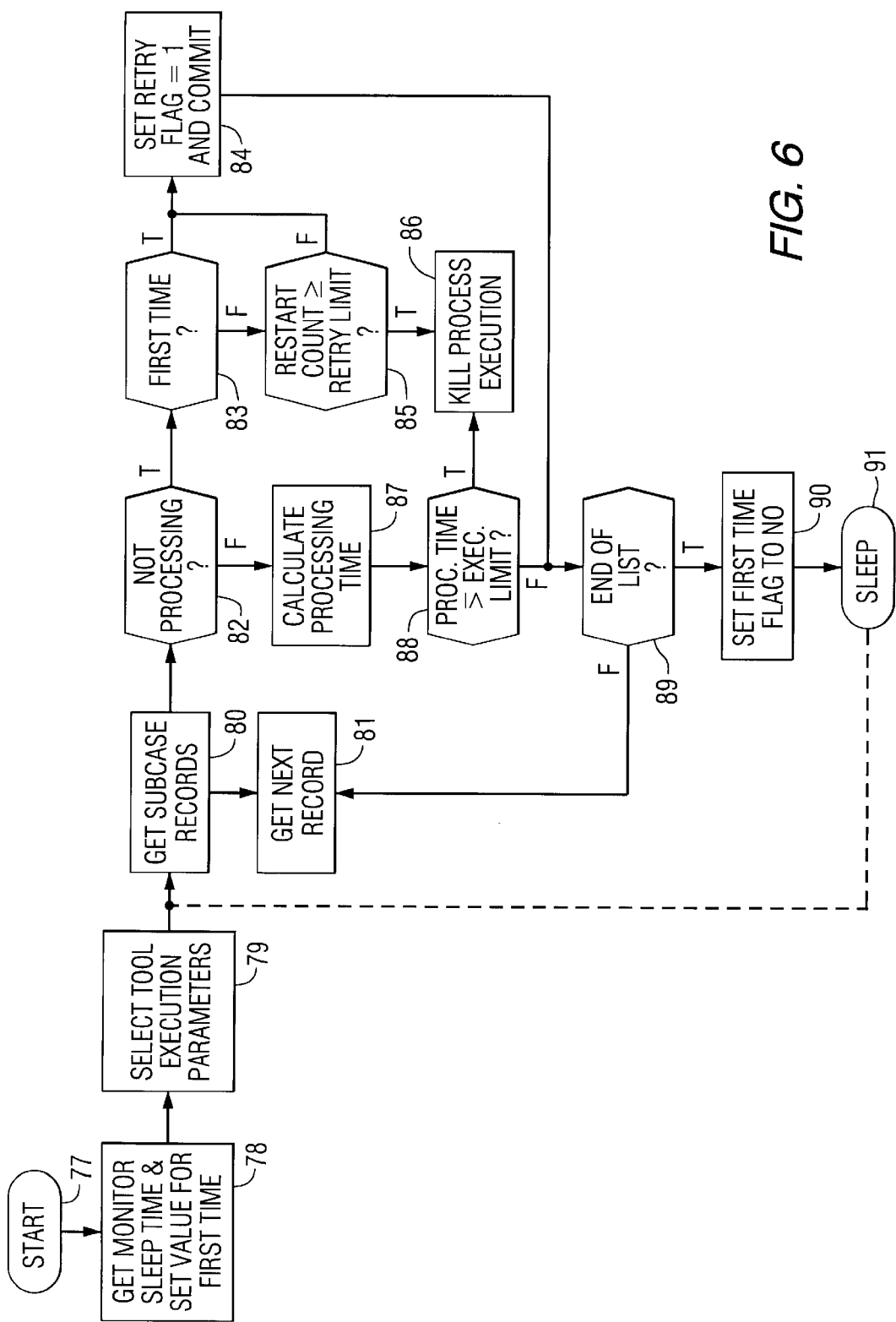

If the download tool subcase is not currently processing, the result from the decision step 82 is false. Processing then moves to a step 87 where the processing lapsed time is calculated. At a decision step 88, the processing time is compared to the processing time limit. If the limit has been exceeded, processing moves to the step 86 where execution is terminated. Whenever an execution is terminated, a record is created calling this occurrence to the attention of the system user. At this point, human intervention is required to resolve the processing problem. For example, processing may have been unsuccessful due to corrupted data in the download tool case. If the result from the decision step 88 is false, the tool continues to execute the subcase and the tool monitor process moves to a decision step 89. Note that processing also moves to the decision step 89, after the step 84. At the decision step 89, if the end of the list has not been reached, processing returns to the step 81 for fetching the next download tool subcase. If the end of list has been reached, the first time flag is set to "no" at a step 90. The tool monitor then sleeps, as indicated at a step 91. When the sleep time expires, processing returns to the step 80 where the download tool subcases are again retrieved, The analysis scheduler 10 also closes tool execution after processing all the download tool cases. FIG. 6 illustrates the software steps for a download case closer program executed by the analysis scheduler 10. Processing begins at a start step 94 and continues to a decision step 95. Here the download cases are examined to determine whether any indicate that both the fault and parameter downloads have been completed and all the download tool subcases under the download case have been closed following tool processing of the download tool subcase, or the download has failed due to a communications problem. If either of these statements is true, processing moves to a step 96 where the download case is closed. Once all download tool subcases have been closed, the corresponding download case can be closed. Also, if the download of data from the locomotive has failed, the download case can be closed. If the response from the decision step 95 is false, the case closer downloads the sleep time from the database at a step 97. The case closer program then sleeps, as indicated at a sleep step 98. At the end of the sleep time, processing returns to the decision step 95. In one embodiment of the present invention, the sleep time is 24 hours.

Figure 7:
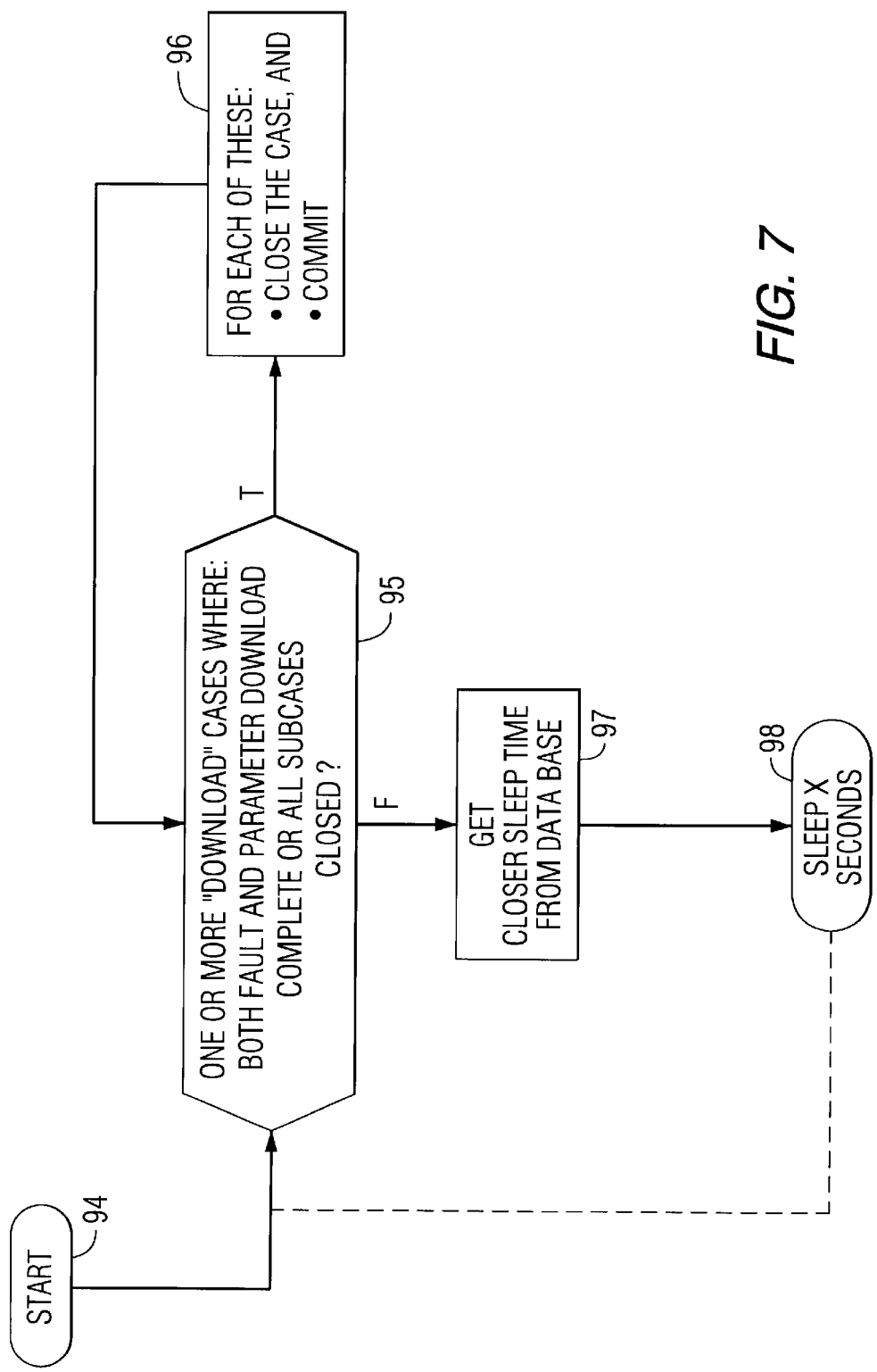
FIG. 7 illustrates the case creation process of the present invention.

FIG. 7 illustrates the process utilized by the present invention for creating an analysis and repair case, otherwise referred to as a problem case. As is known in the art, a case is a collection of information relevant to one or more performance anomalies or faults. For instance, as applied to the present invention, the case includes output information from the various analysis and diagnostic tools, fault repair codes, and anomaly code data associated with the downloaded data. The case also includes repair recommendations, again as determined by the analysis and diagnostic tools. All the case information is available to a user, who is someone knowledgeable in the area of locomotive faults and repairs. The user reviews the case to determine the accuracy of the information presented therein and may further append additional information. For instance, the user can add repair recommendations based on his experiences. Once the case is completed, the user transmits the case to railroad maintenance and service personnel. This can be accomplished by simply calling the railroad or sending the case via electronic mail. The objective is to provide the case information to the railroad so that the repair recommendations included therein can be implemented in a timely fashion to avoid a locomotive break down.

Most of the time the processing of a given download is uneventful, and there is nothing to note that is wrong with the locomotive. In such situations, no problem case is required, and the download case and download tool subcases are saved to journalize this. However, if one or more of the analysis tools detects an anomalous condition, then a problem case is automatically created, which serves to collect and summarize all of the outputs of all the analysis tools.

FIG. 7 shows a locomotive providing three different types of information to a problem case creation system constructed according to the teachings of the present invention. As discussed in greater detail in the patent applicable entitled "On-board Monitor for a Railroad Locomotive", cited above, certain severe faults within the locomotive immediately generate a call home (as designated by reference character 101) to the monitoring and diagnostic service center, where the problem case creation system resides. These faults are either severe in nature or require immediate attention and thus create a problem case directly, as indicated by a create case step 102. (See also the case generator 37 in FIG. 1). To create the problem case, the call home process initiates a fault data download and a monitored parameter download as shown at a step 104. The problem case is then created at the step 102. Later, after the fault and monitored parameter information has been analyzed by the diagnostic tools, the results thereof will likely be added to the problem case created by the call home sequence. It is possible, however, that a new problem case, derived solely from the downloaded data, may also be created.

As discussed above in conjunction with the analysis scheduler 10, a step 106 depicts the downloading of fault data from the locomotive to the monitoring and diagnostic center where the analysis process occurs. In one embodiment, fault data is downloaded at least daily. It is possible, however, that there may be no fault data to download and in this case the fault tools are not run as there is no input data to be analyzed. Once the fault data is downloaded, processing moves to a step 108 where the analysis scheduler process is executed as discussed above in conjunction with the analysis scheduler 10. At steps 110, 112, 114, and 116, the case-based reasoning (CBR), Bayesian belief network (BBN), fault classification (FC), and data pack anomaly detection (DPAD) tools are run, respectively. These tools are examples of fault and data analysis tools that can be utilized in conjunction with the present invention. Those skilled in the art recognize that other similar analysis tools are available. These tools which were referred to generally by reference character 36 in FIG. 1, will be discussed in further detail below. Although not shown in FIG. 7, there is a data queue associated with each of the tools depicted. These queues hold the data until the tool is available for execution. Essentially, each tool analyzes the data based on different rules and metrics, including historical cases (faults, repairs and operational parametric information) and artificial intelligence schemes, to determine the nature of the fault and identify specific repairs (by repair code) that can be implemented to alleviate the fault. The tools may also identify incipient problems within the locomotive, and thus allow the railroad to take corrective action before the problem becomes more severe.

Although the tools are shown executing in a parallel fashion in FIG. 7, as is known to those skilled in the art, this is not a mandatory requirement. Other embodiments of the present invention include execution alternatives. For instance, the tools can run serially or in parallel after the downloaded case has been created and each of the download tool subcases have been created, or each tool can run independently after the download tool subcase for that specific tool is available. After all tools have processed the data, the case repetition detection step as illustrated by reference character 118 is executed. Finally, each tool can execute independently after its download tool subcase is completed and then immediately execute the case repetition detection step 118. The selection of one of these alternatives is not crucial to the essential scope or function of the present invention.

The tool spawner component (illustrated in FIGS. 4A and 4B) of the present invention controls the execution sequence of the tools illustrated in FIG. 7. Of course, a tool cannot execute until any prerequisite tools have been executed. The tool execution table 28 illustrated in FIG. 1 stores the conditions that must be met before a specific tool can be run. The case repetition detection tool (see reference character 118 of FIG. 7) is an additional tool of the present invention for which information is included in the tool execution table 28. The case repetition detection tool 118 is run to detect repetitive cases after one or more of the other tools has executed. The case repetition detection tools will be discussed further herein below in conjunction with FIGS. 8A and 8B.

Whenever a new problem case is created, as indicated by the step 102 of FIG. 7, certain information is entered into case fields to assist the expert user at the monitoring and diagnostic service center in analyzing the problem case. The information in the case fields may include: fault codes and descriptions of symptoms they indicate, repair codes and descriptions of repairs indicated, anomaly codes and descriptions of the warnings indicated, monitor parametric values associated with faults, repairs and anomalies, probability or weighting factors associated with the indicated codes (where the weighting factors indicate the probability that the indicated repair will solve the indicated fault), and the date, time and locomotive road number.

Returning to FIG. 7, in addition to fault data, parametric performance data is also downloaded from the locomotive, as identified at a step 124. Analysis scheduler processing occurs, as discussed in conjunction with FIGS. 1–6, when the download is complete (as illustrated at a step 126). The step 126 is followed by running of the anomaly detection tool, (illustrated by a step 128), and running of a trend tool (illustrated by a step 130). The case repetition detection program is run at the step 118. If necessary, a case is created at the step 102 as discussed herein above.

Figure 8:
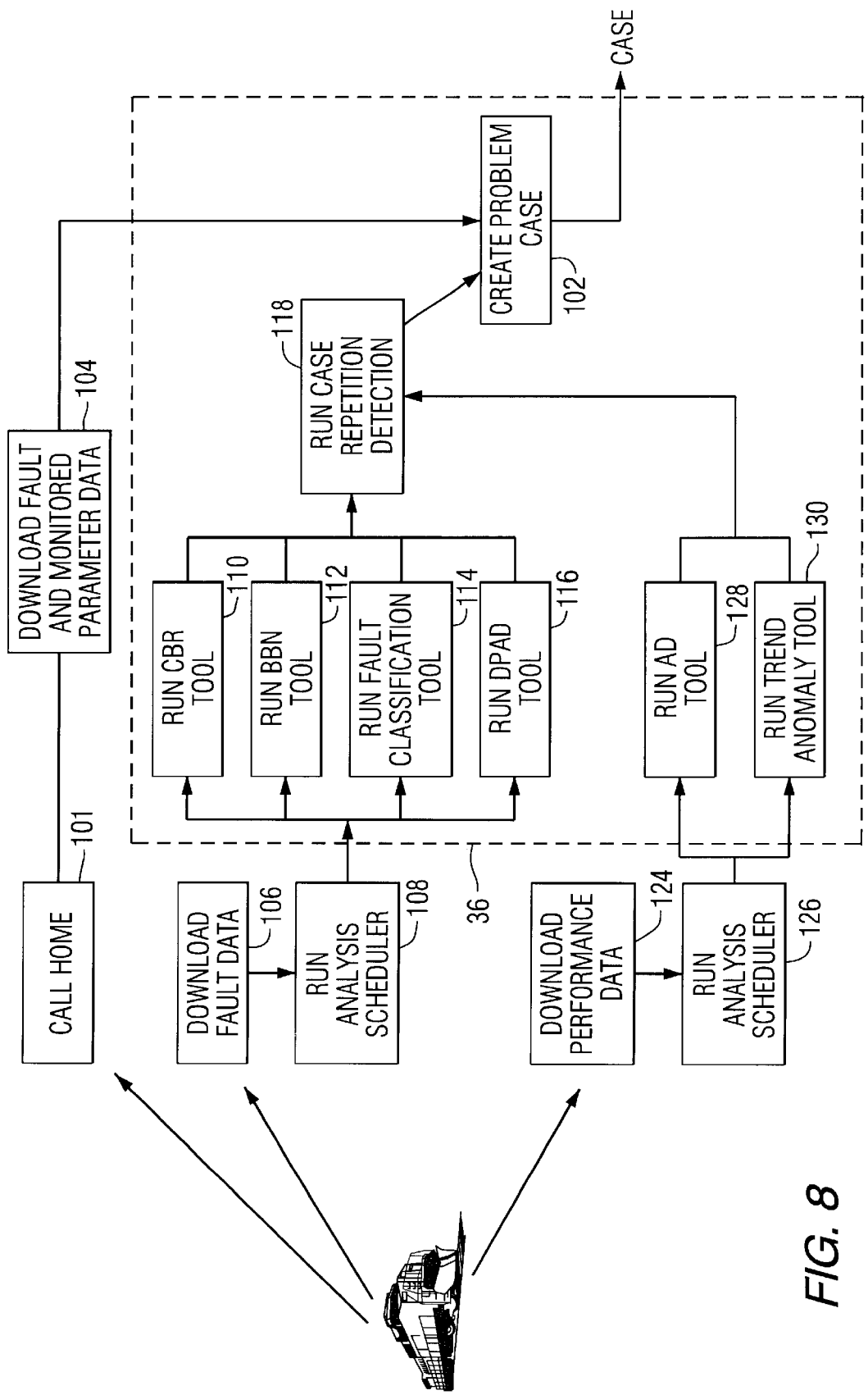
FIG. 8 is a software flow charts depicting the case creation process.

The flow charts of FIGS. 8A and 8B illustrate the algorithm for creating a case in accordance with the present invention, combining the features of the step 118 (run case repetition detection) and 102 (create problem case). Processing begins at a step 160, depicting the data download process. From the step 160, processing moves to both a step 162 and a step 164. At the step 162, the case-based reasoning (CBR), Bayesian belief network (BBN), and data pack anomaly (DPAD) tools are executed for the purpose of developing a problem case and advantageously for developing repair recommendations for that problem case. The execution of these tools will be discussed in detail below. At the step 162, the tools are run using their normal look-back time period. As will be discussed further herein below, the look-back time is that period measured from the present to a point in the past, during which data collected will be processed by the tool. For instance, in one example, the look-back period is seven days. Therefore, the tool will analyze fault data provided during the past seven days in an attempt to classify faults and develop repair recommendations. From the step 162, processing moves to a decision step 166 for determining whether any repair recommendations have been generated by the case based reasoning, the Bayesian belief network, or the data pack anomaly detection tool. If no such repairs have been recommended, then this stage of the processing is completed, as illustrated by a step 168. If repairs were recommended, processing moves from the decision step 166 to another decision step 170, where the process determines whether there are any existing closed or recommended problem cases. Closed cases are those for which the repair recommendations have been implemented by the railroad. Recommended cases are those where the repair recommendations have been transmitted to the railroad, and thus, in a sense, are no longer subject to changes or additions by expert personnel at the monitoring and diagnostic service center. Only open cases can be augmented by information from the current execution of the analysis and diagnostic tools. If there are no closed or recommended cases, processing moves to a step 172 where the repairs recommended by the tool are added to a repair list, identified in FIGS. 8A and 8B by a reference character 174.

If there are existing closed or recommended cases, then processing moves from the decision step 170 to a decision step 180. The decision step 180 determines whether any of the recommended repairs are identical to repairs in closed or recommended problem cases that were created within the look-back time frame. If there are no such identical repairs, then processing returns to the step 172 where these repairs are added to the repair list, where they may later be used to create a problem case. If all of the repairs are identical to repairs in closed or recommended problem cases, then it is necessary to change the look-back time so that only data collected after the most recently recommended or closed case is included in the tool analysis. In this way, the process ensures that only parameter and fault data collected after the most recent repair recommendation can generate a new problem case, because the data relied upon to create a previous, closed or recommended problem case is no longer relevant for creating new problem cases. If the railroad has not yet performed a recommended repair, then the same kind of faults will be seen during the next download of fault and performance information resulting in generation of the same repair recommendations. The case repetition detection process (see reference character 118 of FIG. 7) will then combine the current recommended problem case with existing recommended problem cases. This look-back time interval change is depicted by a step 182, where the look-back period is changed to begin immediately after the most recent recommended or closed case. At a step 184, the case based reasoning, Bayesian belief network, and data pack anomaly tools are re-run with the modified look-back parameter.

At a decision step 186, the process determines whether any repairs were recommended by the tool execution at the step 184, i.e., based on the tool re-run using the new look-back period. If no repairs were recommended, then this stage of the processing is completed, as depicted by a step 190. If there are any recommended repairs, they must be added to the repair list, as illustrated at a step 188.

Returning to the download data step 160, at a step 164 the anomaly detection (AD) and trend anomaly detection tools are run. Also, at a step 196 the fault classification and anomaly detection tools are executed. All anomalies found are added to an anomaly list 200 at a step 198.

From the step 164, after the trend anomaly tool is executed, processing moves to a decision step 202 to determine whether any anomalies were recommended. If none were recommended, processing terminates at a step 204. If anomalies were found and recommended, processing moves to a decision step 206 where, as before, the process determines whether any existing or recommended problem cases are open. If no such problem cases are open, processing moves to a step 208 where the new anomalies are added to the anomaly list 200. If there are existing closed or recommended problem cases, then from the step 206 processing continues to a decision step 210. Here a determination is made whether the trend anomalies detected are identical to any trend anomalies in closed or recommended problem cases. If there are no such identities, processing again moves to the step 208, where the trend anomalies are added to the anomaly list. If one or more of the anomalies are identical to anomalies listed in closed or recommended problem cases, processing moves to a step 212 where the anomaly trend tool is run again without use of the state file, which stores historic operational trends. This process of rerunning the tools without the state files removes the effect of anomalies that should have been addressed by prior recommended or closed cases. After the anomaly tool is re-run, at a decision step 214 a determination is made whether any anomalies were detected. If none were detected, processing ends at a step 216. If anomalies were detected, they are added to the anomalies list by processing through a step 208.

After repairs are added to the repair list 174 and anomalies are added to the anomaly list (represented by a reference character 200), processing moves to a decision step 222. Here, the process determines whether there are any open problem cases. If there are no open problem cases at that point, a new case is created at a step 224 and processing terminates at a step 226. The new problem case contains all the anomalies from the anomaly list 200 and all repairs from the repair list 174.

Alternatively, if there are open problem cases, it must be determined whether the repairs or anomalies can be added to them at a decision step 230. Here it is determined whether there are any open problem cases less than x hours old, where x is a threshold value assigned by the user. If such an open problem case is available, processing moves to a step 232 where all of the anomalies and repairs are added to the repair list for that problem case. Also, the download case from which the faults and/or anomalies were derived is linked as a child to the open problem case. The same locomotive symptoms may appear in multiple downloads over many days and all such downloads should be linked to the same open problem case.

If there are no open cases less than x hours old, processing moves from the decision step 230 to a decision step 234 for determining whether there are any repairs in the repair list 174. If there are none, then processing continues to the decision step 236 where it is determined whether all the anomalies are found in an open case. If the answer is no, processing moves to a step 238 where a new case containing all the anomalies is created. Processing then terminates at the step 226. If all the anomalies are already found in an open case, processing moves from the decision step 236 to a step 242 where the download case from which the current anomalies were derived is linked as a child of that open problem case.

Returning to the decision step 234, if there are repairs in the repair list 174, processing moves to a decision step 244. Here, it is determined whether all of the repairs are identical to those in an open problem case. If that is a true statement, processing returns to the step 242 where the download case is linked as a child to that open problem case. If all the repairs are not identical to those in an open problem case, processing moves from the decision step 244 to the step 224 where a new problem case is created. Processing then terminates at the step 226.

Figure 9A:
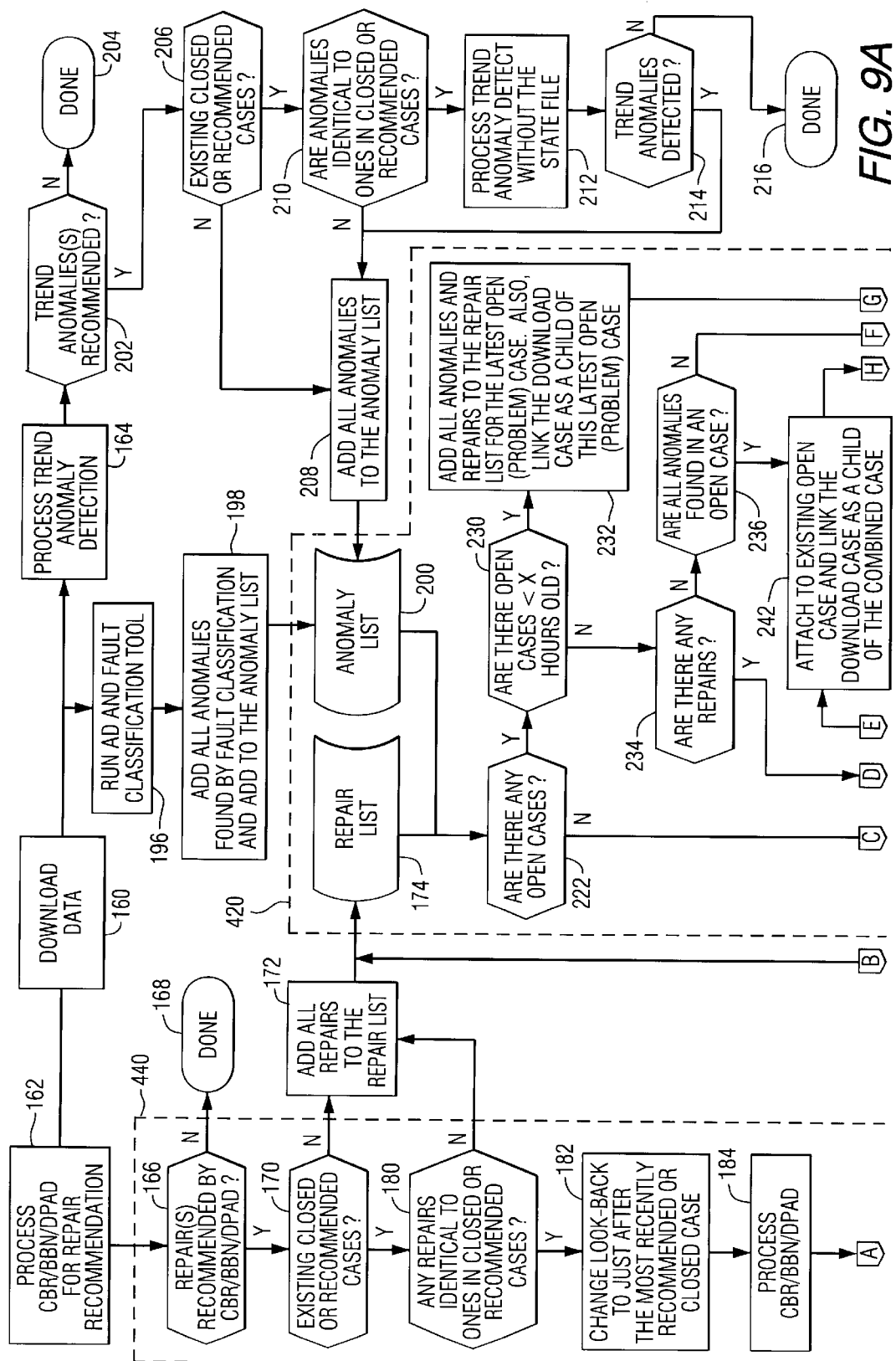
FIGS. 9, 10, 11, 12, 13, 14 and 15 illustrate the operation of the analysis and diagnostic tools shown in FIG. 7.
Figure 9B:
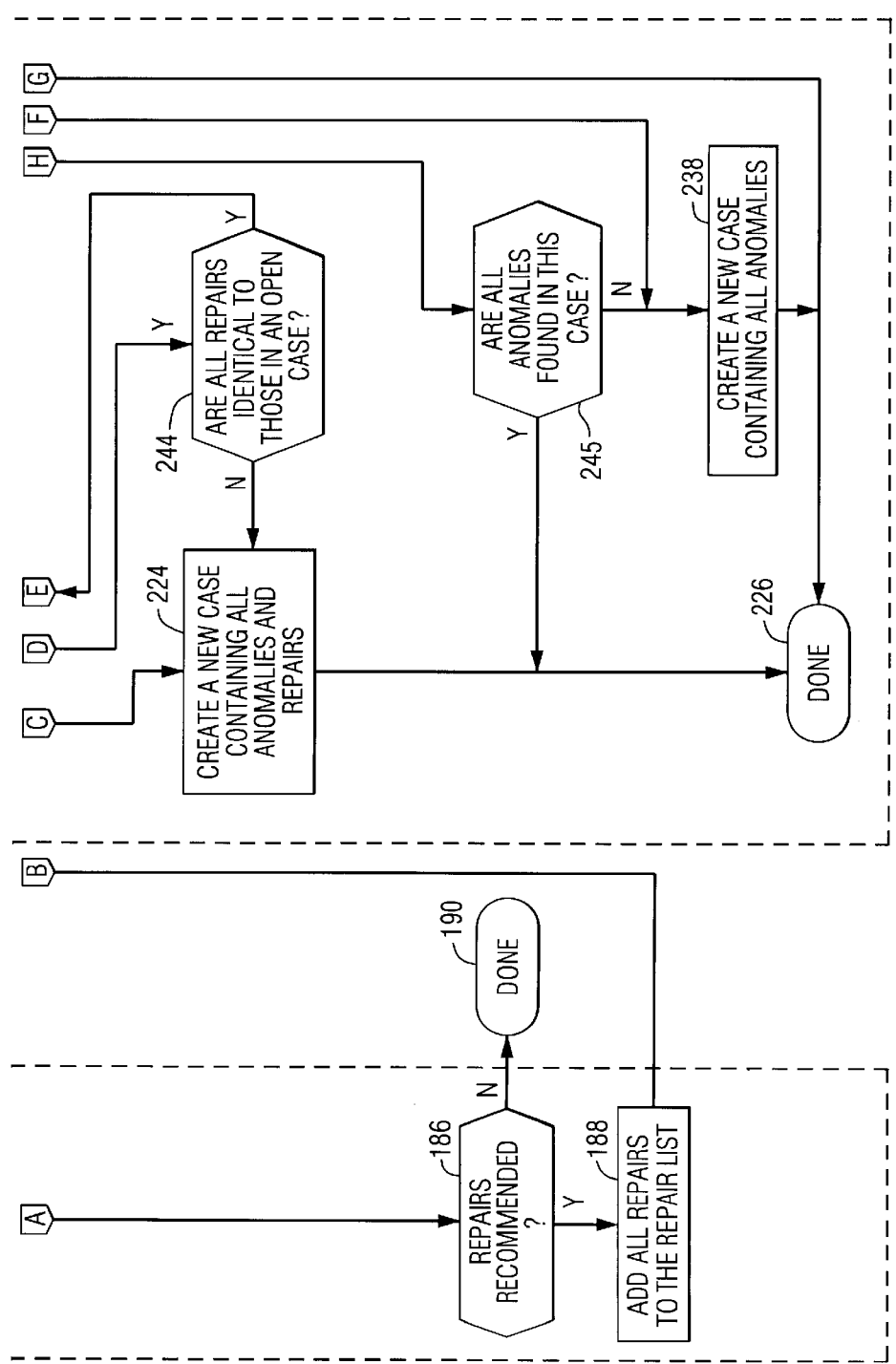

FIG. 9 illustrates the operational characteristics of the case-based reasoning tool as identified by reference character 299. In the context of the case-based reasoning tool, a "case" is a collection of faults, anomalies, recommended repairs, and operational parametric information aggregated for the purpose of comparing with other "cases" to determine a recommended repair to resolve the fault. As discussed above, on the first pass, the case-based reasoning tool uses a standard look-back period of seven days. This can be modified for subsequent executions, also as discussed above, dependent upon whether there are any repairs identical to those recommended by the case-based reasoning tool in a closed or a recommended case. The case-based reasoning tool analyzes the fault data and combinations thereof, using information from the case-based reasoning case base 300.

The configuration table 30 (see FIG. 1) identifies the version of the case-based reasoning tool 299 that is to run, based upon the locomotive road number from which the fault and parametric operational data was taken. Reference character 304 illustrates the fault and related operational parametric information input to the case-based reasoning tool 299. The fault data covers only the current look-back period and is noise reduced. Noise reduction is the process of eliminating known faults in the locomotive. For instance, when the locomotive is in idle state, certain measured parameters may be beyond a pre-established threshold and, therefore, falsely indicate the occurrence of a fault.

The configuration table 30 also provides the probability threshold used by the case-based reasoning tool as a probability limit for recommending repairs. If the case-based reasoning tool determines that the probability that a specific repair will resolve a fault is above a threshold probability value, then that repair (in the form of a repair code) will be reported by the case-based reasoning tool 299. The case-based reasoning tool 299 prioritizes the repair recommendations and reports the top five repair codes, as depicted by reference character 306. Following processing by the case-based reasoning tool 299, the system will run the case repetition detection process (see reference character 118 in FIG. 7).

Further details of the case-based reasoning tool can be found in the commonly assigned patent applications "Method and System for Processing Repair Data and Fault Log Data to Facilitate Diagnostics", bearing U.S. patent application Ser. No. 09/285,612 and filed on Apr. 2, 1999, and "Method and System for Analyzing Fault Log Data for Diagnostics", bearing U.S. patent application Ser. No. 09/285,611 and filed on Apr. 2, 1999. The disclosures of these patent applications are herein incorporated by reference.

Figure 10:
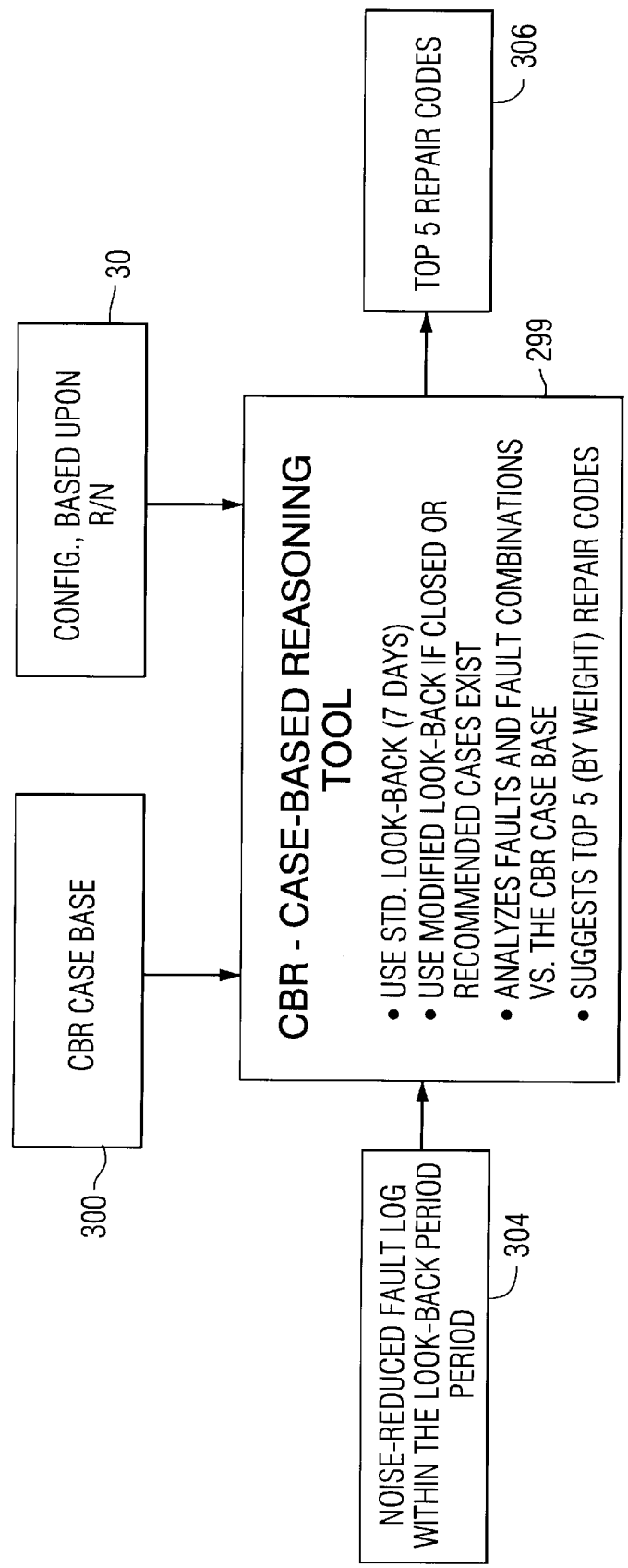

FIG. 10 illustrates the Bayesian belief network tool 310. Each version of the Bayesian belief network tool 310 uses a specific rule base, as depicted by reference character 314. The specific configuration selected is based on the locomotive road number. A reference character 316 depicts a table linking causes identified by the Bayesian belief network tool 310 to specific repairs for a problem case. The Bayesian belief network rule base 314 also identifies the repair probability thresholds used for prioritizing repairs. Like the case-based reasoning tool 299, the Bayesian belief network tool 310 uses a seven day look-back in one embodiment. This look-back is modified (as discussed in conjunction with FIGS. 8A and 8B) to eliminate the effects of closed or recommended cases. The output from the Bayesian belief network tool 310 is the top three repair codes. After the Bayesian belief network tool 310 runs, the system runs the case repetition detection tool as illustrated by reference character 118 in FIG. 7.

Figure 11:
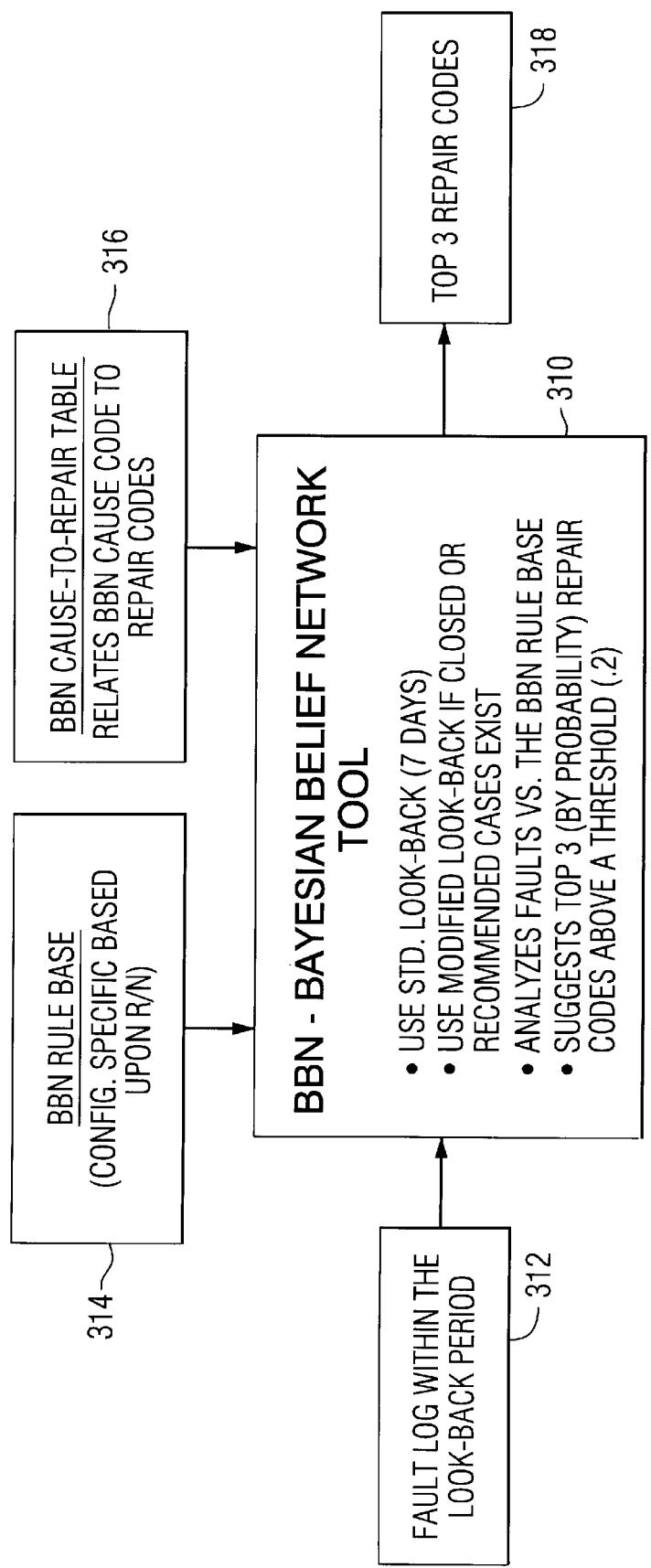

FIG. 11 illustrates the fault classification tool 326. This tool receives input from the fault log of the current download, just as the tools discussed previously, as shown by a reference character 328. There is no look-back period associated with execution of the fault classification tool 326. Also input to the fault classification tool 326 is a fault service strategy table 330. This table comprises a list of typical faults found within a railroad locomotive and a priority ranking for each. Each fault in the table is identified with an indicator value as either a "critical fault", "other fault", or "not found on the fault service strategy table". The fault classification tool compares the faults from the fault log 328 with those listed in the fault service strategy table 330, to assign an indicator value to each fault. The output fault codes with the indicator value are depicted by a reference character 332 in FIG. 11.

Figure 12:
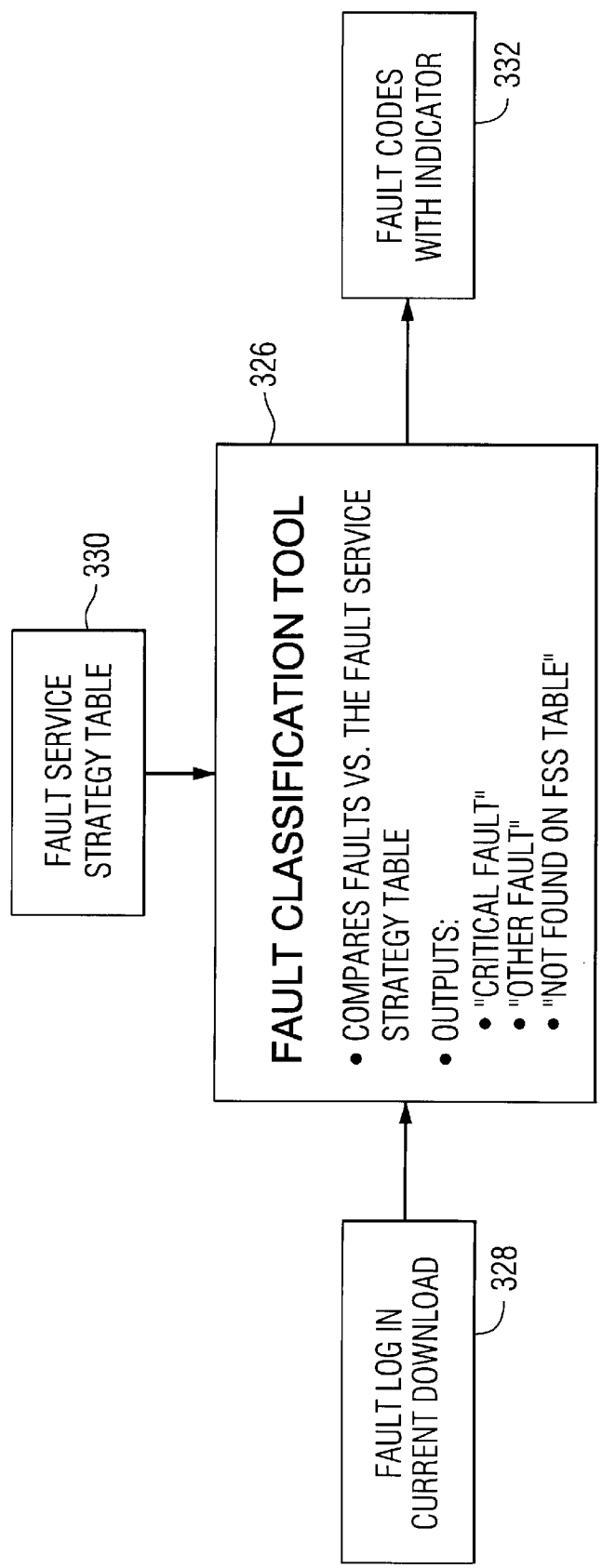

FIG. 12 illustrates the data pack anomaly detection (DPAD) tool 336. This tool operates on fault log operational parametric data (also referred to as "data pack" data) (see reference character 338) within the look-back period. The data pack data is collected when a fault occurs and provides a measure of operational conditions (voltage, temperature, etc.) of selected locomotive systems. The DPAD rules are programmed into the data pack anomaly detection tool 336, and the data pack anomaly detection tool 336 is configured, using the locomotive road number, by parameters in the configuration table 30. The "data pack" consists of 16 parameters (in one embodiment) that are sampled with the occurrence of each fault. The data pack anomaly detection tool examines the parametric values and the accompanying fault to determine a repair recommendation. The output from the data pack anomaly detection tool 336 is a list of repair codes including all repair codes that are indicated by the rule comparison process. The output repair codes are depicted generally in FIG. 12 by reference character 344.

Figure 13:
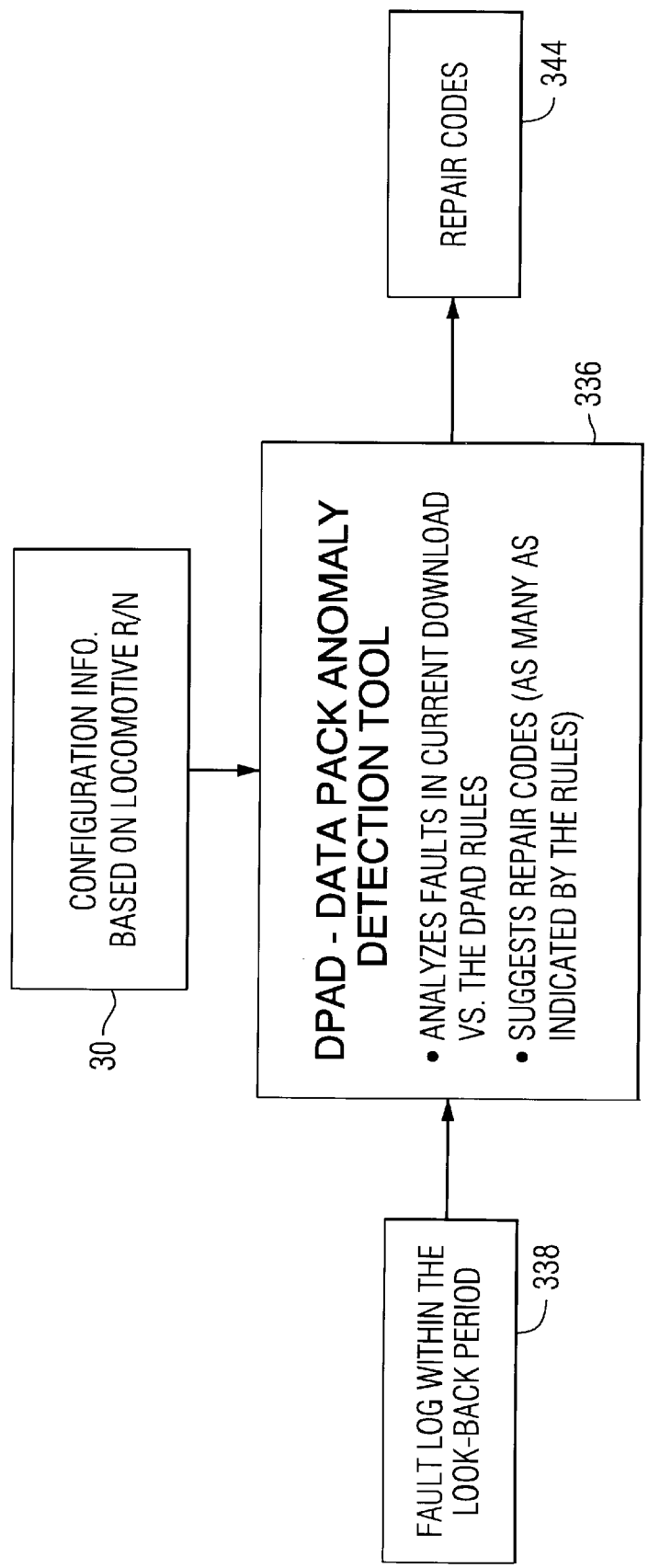

The anomaly detection tool 350 is illustrated in FIG. 13. This tool analyzes parameters received from the current download case (see reference character 352) and compares the parameters with limits and criteria from the anomaly definitions. A diagnostic engine map file 354 supplies internal anomaly codes that are mapped to parameters in the anomaly definition table. Thus, when a particular parameter correlates with an anomaly in the table, the anomaly detection tool outputs the internal code associated with that anomaly. Configuration data for the anomaly detection tool 350 is input from an initiation file stored in the configuration table 30. This file provides the initial configuration data, including the anomaly detection tool version number that is to execute based on the locomotive road number from which downloaded parametric performance data was collected. The anomaly indicators provided as an output by the anomaly detection tool 350 are indicated by reference character 360. In addition to the anomaly indicators 360, the anomaly detection tool 350 provides derived parameters (for example, statistics) as an output. These are indicated in FIG. 13 by reference character 362. These derived parameters are calculated from parametric performance data in the download case and are saved to a database or table for use in graphs and other analysis aids.

Figure 14:
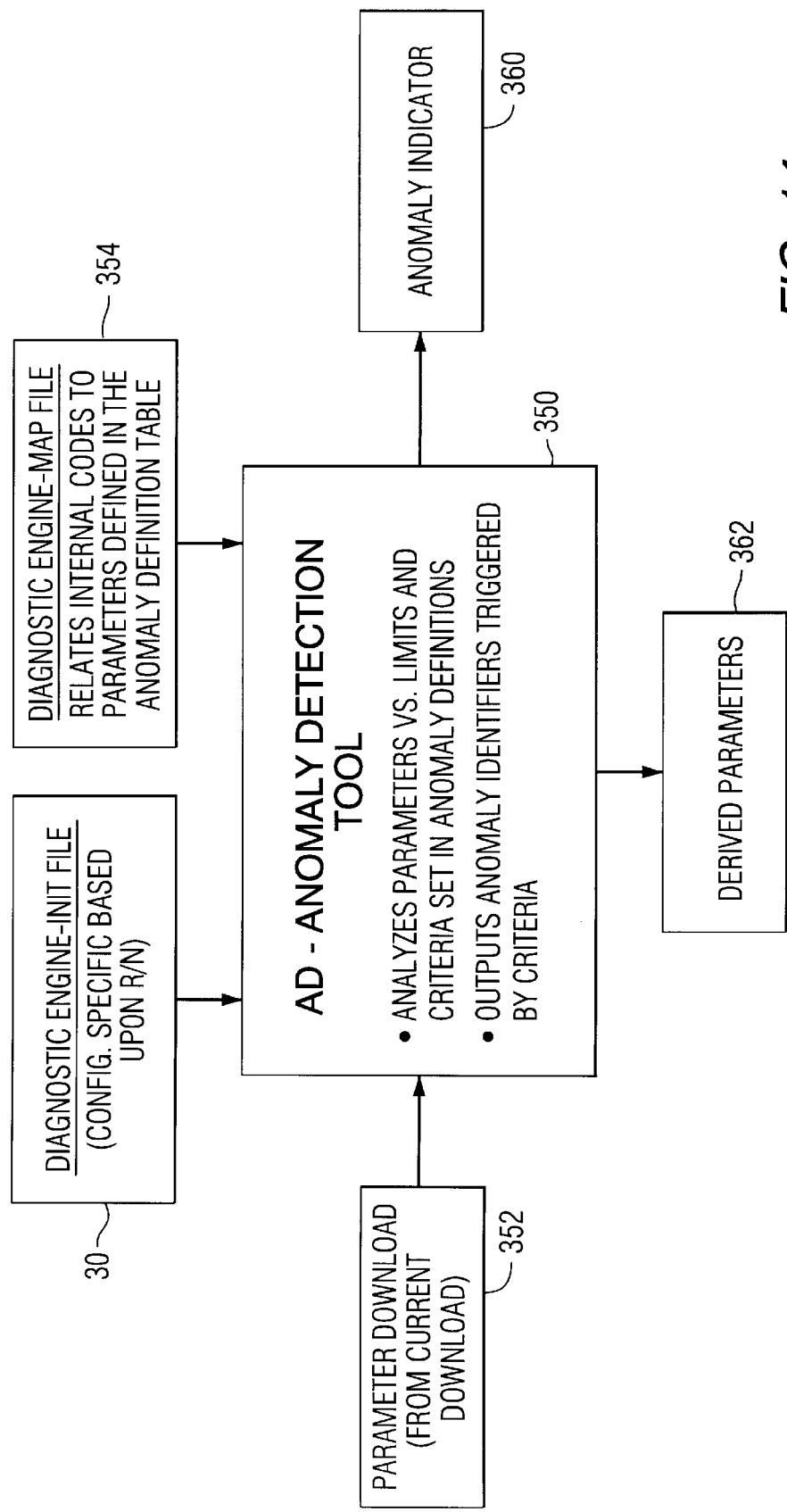

FIG. 14 illustrates the trend anomaly tool 370. Like the anomaly detection tool 350, this tool also compares specific operational parameters from the locomotive with values defined in the anomaly definition table, represented generally by reference character 372. Configuration information is provided from the configuration table 30 for identifying the specific version of the trending tool 370 that is to operate on the data, based on the locomotive road number. Parametric performance parameters uploaded from the locomotive (and illustrated by reference character 376) are input to the trending tool 370. Only the current download case information is used by the trend anomaly tool 370. Also input to the trend anomaly tool 370 is a state file 378, which includes statistical data (e.g., mean, median, standard deviation) derived from historical performance data. The trend anomaly tool 370 analyzes the current parameter data against the historical statistics and compares the results of this analysis with limits and criteria set forth in the anomaly definitions, as provided by the definition table 372. The trend anomaly tool 370 outputs the anomaly identifiers associated with the results of this comparison process (see reference character 380) and updates the statistics contained within the state file, as indicated by reference character 382. The state file is re-initialized if there are any closed or recommended cases within the look-back period. Also output from the trend anomaly tool 370 are derived parameters 384, which are useful for creating graphs, charts and other analysis aids. As discussed in conjunction with the other tools that are run, following execution of the trend anomaly tool 370, a case repetition detection program is run (as illustrated by reference character 132 in FIG. 7).

The case repetition detection feature (see reference character 118 of FIG. 7) is an important feature of the present invention. To focus limited resources on solving only new unreported problems, it is necessary to avoid the creation of new problem cases when existing cases cover the same previously reported problem. The features of the case repetition detection element include: the ability to distinguish a new problem case based upon the makeup of detected faults, anomalous conditions, and recommended repairs reported by the automated analysis tools of the present invention; the ability to create a new problem case to store information about a new problem, the ability to maintain an open time frame so that related data can be analyzed and combined into a single problem case if necessary; and the ability to distinguish and link additional relevant data to pre-existing cases instead of creating a new case.

Returning to FIGS. 8A and 8B, the case repetition detection element of the present invention is shown within the dash lines identified by reference character 420. The result of the case repetition detection process is the creation of a new case (see the steps 224 and 238) or the addition of the current anomaly and fault information to an existing case, as depicted at the step 232.

Figure 15:
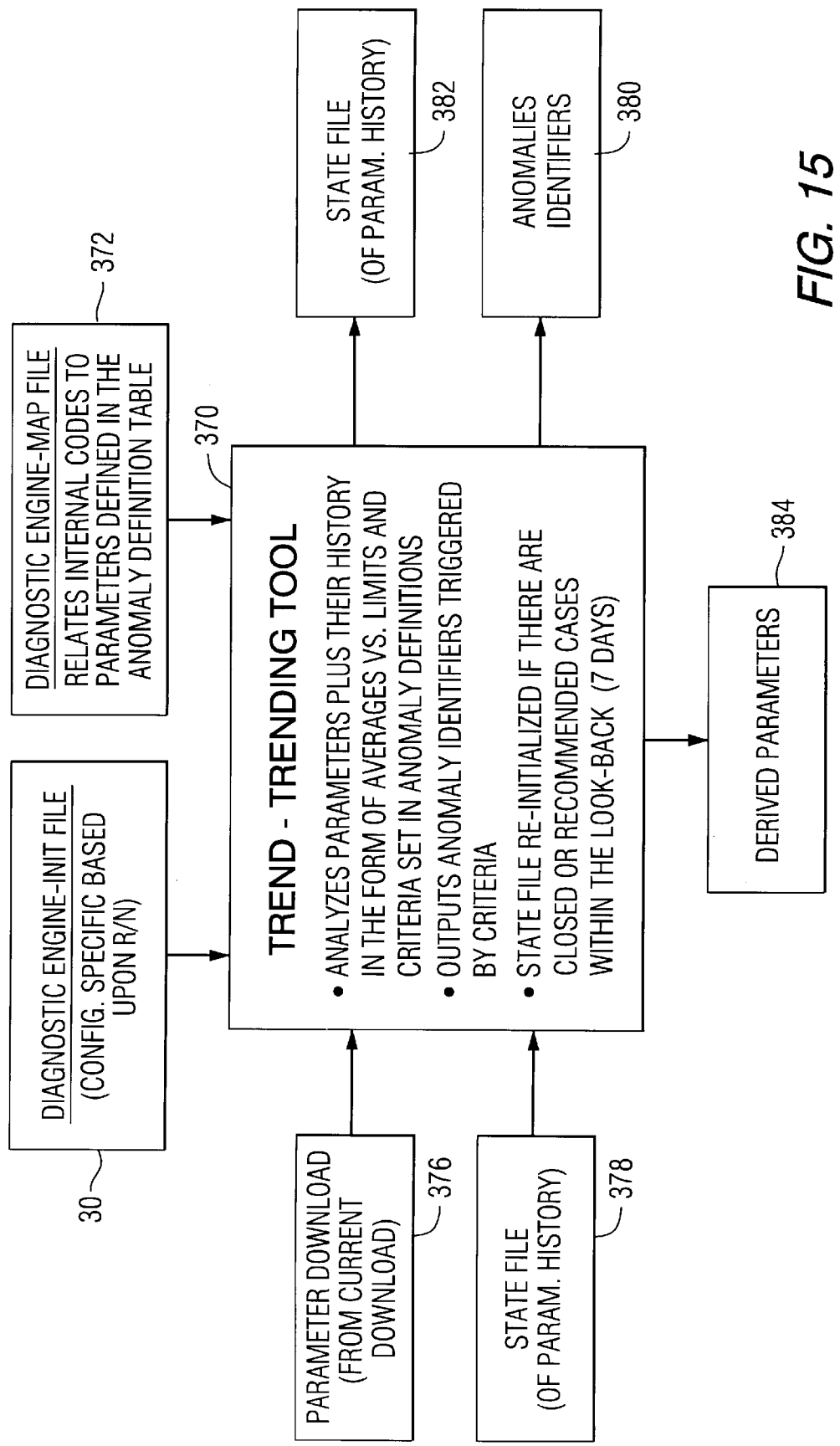
Figure 16:
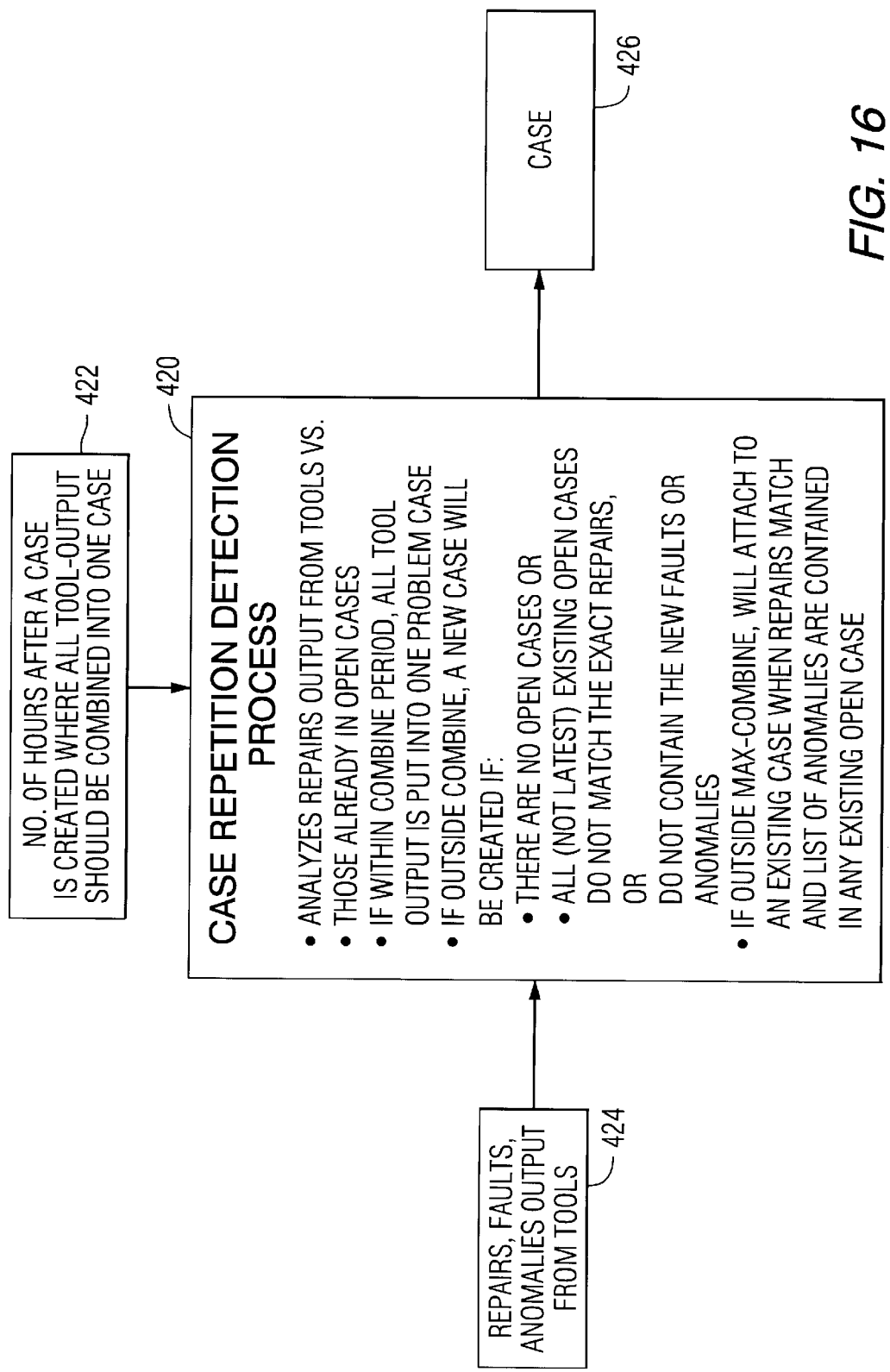
FIGS. 16–17 illustrate the case repetition detection process of the present invention.
Figure 17:
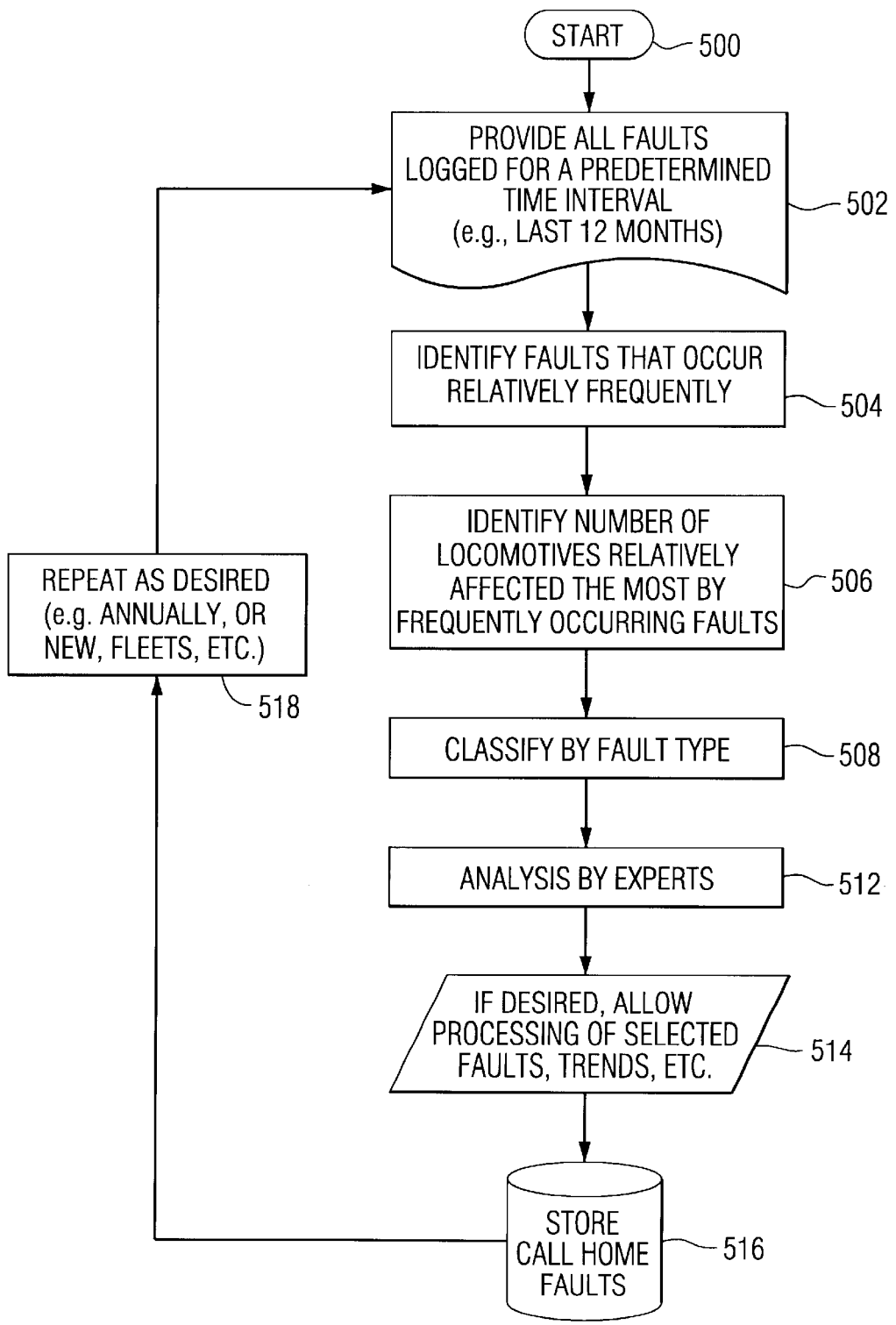

The case repetition detection process is also shown diagrammatically in FIG. 15. Reference characters 422 and 424 depict input values to the case repetition process 420. The input value represented by reference character 422 is the number of hours after a problem case is created during which all tool outputs should be combined into a single case (see reference character 422), rather than creating multiple cases. This input value is user defined and referred to as "x" in the decision step 230 of FIG. 8A. To run the case repetition detection process, current repairs, faults, and anomalies identified by the tools are used as input values (see reference character 424 of FIG. 15). If there are no problem cases within the selected combination period, then a new problem case may be created. If there is a problem case within the combination period, then all the repair recommendations made during that period (including the current recommended repairs) are combined into one problem case. As discussed above, each case includes the faults and anomalies associated with the repair recommendation and therefore this information is also contained within the problem case. If processing is outside the case combination period, the case repetition detection process 420 checks all the open problem cases outside the case combination period and attaches the new problem case as a child to an existing problem case if the repairs of the two problem cases match and if the list of anomalies or faults in the new problem case are contained in the existing problem case. This feature is also depicted at the step 232 and 242 of FIG. 8A. If there is no match, then a new problem case is created. The creation of a new case by the case repetition detection process 420 is depicted at an output step 426.

Another important feature of the present invention is the re-analysis of the created problem cases after the completion of a recommended repair. This process is shown in FIGS. 8A and 8B by reference character 440. This aspect of the present invention is implemented by the use of a look-back parameter as previously discussed herein. The objective of this feature is to screen out anomalies or faults that in fact have already been addressed through recent repair actions or recommendations. Following is a summary of the steps involved in the re-analysis process 440. Repairs are not added to the list if all of the following conditions are met: the results of the analysis indicates that there is an anomalous condition and/or repair code needed (see the decision step 166 of FIG. 8A); the locomotive has been repaired or repair recommendations have been made recently (see the decision step 170 of FIG. 8A); the anomalous conditions and/or repair codes are the same as those that were identified before the repair recommendation or operation (see the decision step 180 of FIG. 8A); the data that indicated an anomalous condition or repair is re-analyzed so that input download data preceding the repair recommendation or operation is not included within that re-analysis (see the step 182 of FIG. 8A; and the re-analysis indicates that no anomalous condition is present and no repair is needed (see the step 184 and the decision step 186 of FIG. 8A).

While the invention has been described with reference to a preferred embodiment, it will be understood by those skilled in the art that various changes may be made and equivalent elements may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for scheduling the execution of one or more analysis tools operating on performance data of a plurality of mobile assets to assess the need for remedial action to one or more of the mobile assets, comprising:

c) selecting the highest priority unanalyzed performance data;

d) establishing a limit on the number of executions available to be performed during a predetermined time interval for each of the one or more analysis tools;

e) providing the selected unanalyzed performance data to one or more of the analysis tools if the execution limit for that tool has not been reached; and f) generating a mobile asset specific recommendation based on the results derived from the one or more analysis tools.

2. The method of claim 1 wherein the mobile asset is a railroad locomotive.

3. The method or claim 1 wherein the performance data comprises parametric performance data for the mobile asset.

4. The method of claim 1 wherein the performance data comprises fault data for the mobile asset.

5. The method of claim 1 wherein the performance data comprises data indicating the occurrence of an out-of-spec condition on the mobile asset.

6. The method of claim 1 wherein the mobile asset specific recommendation comprises a repair recommendation.

7. The method of claim 1 wherein the mobile asset specific recommendation comprises a request to collect additional performance data from the mobile asset.

8. The method of claim 1 wherein the mobile asset specific recommendation comprises a request for review of the performance data by an expert in the operation and repair of the mobile asset.

9. The method or claim 1 wherein the step c) comprises:

c1) creating a plurality of performance data sets, wherein each set includes performance data related to an operational event aboard the mobile asset;

c2) assigning a priority ranking to each performance data set; and c3) selecting the highest priority performance data set therefrom.

10. The method of claim 1 wherein the step c) comprises:

c1) segregating the performance data into high-priority data and normal-priority data; and c2) selecting the highest priority performance data from each one of the high-priority data and the normal-priority data.

11. The method of claim 10 wherein the step d) comprises:

d1) establishing a limit on the number of high-priority executions for each analysis tool available to be performed during a predetermined time interval; and d2) establishing a limit on the number of normal-priority executions for each analysis tool available to be performed during a predetermined time interval.

12. The method of claim 1 wherein each one of the one or more analysis tools processes the performance data in parallel.

13. The method of claim 1 further comprising:
g) establishing a look-back period, wherein the selected performance data includes the mobile asset performance data during the look-back period;
h) determining whether the current mobile asset specific recommendation is substantially similar to one or more previous recommendation; and
i) if the current mobile asset specific recommendation is substantially similar to at least one previous recommendation, modifying the look-back period such that the modified look-back period begins after implementation of the previous recommendation, wherein the selected performance data includes the mobile asset performance data during the modified look-back period.

14. The method of claim 1 further comprising:
g) establishing a combining period for the mobile asset specific recommendations;
h) determining whether there are any open mobile asset specific recommendations during the combining period;
i) if there is at least one open mobile asset specific recommendation during the combining period, including the current recommendation with the open recommendation;
j) it there is not at least one open mobile asset specific recommendation during the combining period, analyzing the current mobile asset specific recommendation from the one or more analysis tools to determine whether the current recommendation is substantially similar to an open recommendation; and
k) if there is a substantial similarity, combining the current mobile asset specific recommendation with the substantially similar recommendation.

15. An article of manufacture comprising:
a computer program product comprising a computer-usable medium having a computer-readable code therein for scheduling the execution of one or more analysis tools operating on performance data of a plurality of mobile assets, to assess the need for remedial action to one or more of the mobile assets, the computer-readable code in the article of manufacturer comprising:
a computer-readable program code module for storing the performance data;
a computer-readable program code module for selecting the highest priority unanalyzed data;
a computer-readable program code module for establishing a limit on the number of executions available to be performed during a predetermined time interval for each of the one or more analysis tools;
a computer-readable program code module for providing the selected unanalyzed performance data to one or more of the analysis tools if the execution limit for that tool has not been reached; and
a computer-readable program code module for generating a mobile asset specific recommendation based on the results derived from the one or more analysis tool.

16. The computer program product of claim 15 wherein the mobile asset is a railroad locomotive.

17. The computer program product of claim 15 wherein the computer-readable program code module for storing the performance data further comprises:
a computer-readable program code module for segregating the performance data into high-priority data and normal-priority data;
a computer-readable program code module for selecting the highest priority performance data from each of the high-priority data and normal-priority data; and
wherein the computer-readable program code module for selecting the highest priority unanalyzed performance data further comprises:
a computer-readable program code module for establishing a limit on the number of the high-priority executions available to be performed during a predetermined time interval for each analysis tool; and
a computer-readable program code module for establishing a limit on the number of normal-priority executions available to be performed during a predetermined time interval for each analysis tool.

18. The computer product of claim 15 further comprising:
a computer-readable program code module for establishing a look-back period, wherein the selected performance data includes the mobile asset performance data during the look-back period;
a computer-readable program code module for determining whether the current mobile asset specific recommendation is substantially similar to one or more previous recommendation; and
if the current mobile asset specific recommendation is similar to at least one previous recommendation, modifying the look-back period such that the modified look-back period begins after implementation of the previous recommendation, wherein the selected data includes mobile asset performance data during the modified look-back period.

19. The computer product of claim 15 further comprising:
a computer-readable program code module for establishing a combining period for the mobile asset specific recommendations.
a computer-readable program code module for determining whether there are any open mobile asset specific recommendations during the combining period;
if there is at least one open mobile asset specific recommendation during the combining period, a computer-readable program code module for including the current recommendation with the open recommendation;
if there is not at least one open mobile asset specific recommendation during the combining period, a computer-readable program code module for analyzing the current mobile asset specific recommendation from the one or more analysis tools to determine whether the current recommendation is substantially similar to an open recommendation; and
if there is a substantial similarity, combining the current mobile asset recommendation with the substantially similar recommendation.

20. An apparatus for scheduling the execution of the or more analysis tools operating on performance data of a plurality of mobile assets to assess the need for remedial action to one or more of the mobile assets, wherein each analysis tool includes a predetermined limit on the number of executions available to be performed during a predetermined time interval, said apparatus comprising:
a receiving device for receiving the performance data;
a storage device for storing the performance data;
a controller for selecting the highest priority unanalyzed data from said storage device and for providing the selected performance data as an input to one or more of the analysis tools if the number of executions available to be performed during a predetermined time interval for that tool has not been reached; and a recommendation creator for creating a mobile asset specific recommendation based on the results of the one or more analysis tools.

21. The apparatus of claim 20 wherein the controller segregates the performance data into high-priority data and normal-priority data, and selects the highest priority performance data from each of the high-priority data and the normal-priority data.

22. The apparatus of claim 20 including a look-back period wherein the selected performance data describes the operation of the mobile asset during the look-back period;

a comparator for determining whether the current mobile asset specific recommendation is substantially similar to one or more previous recommendations, and if the current recommendation is substantially similar to at least one previous recommendation, modifying the look-back such that said modified look-back begins after implementation of the previous recommendation, wherein the selected performance data describes the mobile asset performance during the modified look-back.

23. The apparatus of claim 20, further comprising:

a case combining period;

a processor for determining whether there are any open mobile assets specific recommendations during said combining period, and if there is at least one open recommendation during said combining period, for combining the current mobile asset specific recommendation with the open recommendation;

if there is not at least one open mobile assets specific recommendation during the combining period, a comparator responsive to said processor for analyzing the current mobile assets specific recommendation from the one or more tools to determine whether the current recommendation is substantially similar to open recommendations, and if there is a substantial similar, for combining the current mobile asset specific recommendation with the substantially similarly recommendation.

24. An apparatus for scheduling one or more analysis tools operating on performance data from a mobile asset, said apparatus comprising:

a receiver for receiving the performance data;

a storage device for storing the performance data;

a controller for segregating the performance data into high-priority data and normal-priority data;

a selector for selecting the highest priority performance data from the high-priority data and the normal-priority data;

a first limiter for establishing a limit on the number of high-priority executions of each analysis tool that are available to be performed during a predetermined time interval; and a second limiter for establishing a limit on the number of normal-priority executions for each analysis tool that are available to be performed during a predetermined time interval for each analysis tool.

* * * * *